(12) United States Patent
Spitzer-Williams et al.

(10) Patent No.: US 12,062,374 B2
(45) Date of Patent: Aug. 13, 2024

(54) METHODS AND SYSTEMS FOR TRANSCRIPTION OF AUDIO DATA

(71) Applicant: Axon Enterprise, Inc., Scottsdale, AZ (US)

(72) Inventors: Noah Spitzer-Williams, Long Beach, CA (US); Choongyeun Cho, Bellevue, WA (US); Thomas Crosley, Seattle, WA (US); Zachary Goist, Seattle, WA (US); Daniel Bellia, Bend, OR (US); Vinh Nguyen, Ho Chi Minh (VN); Chelsea Alexander-Taylor, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 18/106,916

(22) Filed: Feb. 7, 2023

(65) Prior Publication Data

US 2023/0186918 A1   Jun. 15, 2023

Related U.S. Application Data

(63) Continuation of application No. 17/628,025, filed as application No. PCT/US2020/042211 on Jul. 15, 2020, now Pat. No. 11,640,824.

(Continued)

(51) Int. Cl.
*G10L 15/22* (2006.01)
*G06F 3/16* (2006.01)
(Continued)

(52) U.S. Cl.
CPC .............. *G10L 15/26* (2013.01); *G06F 3/165* (2013.01); *G06F 40/166* (2020.01); *G10L 15/22* (2013.01); *G06Q 50/265* (2013.01)

(58) Field of Classification Search
CPC ......... G10L 15/22; G10L 15/26; G06F 3/165; G06F 40/166; G06Q 50/265
See application file for complete search history.

(56) References Cited

U.S. PATENT DOCUMENTS

| 8,688,092 B1 * | 4/2014 | Bladon ................. H04W 84/12 704/200 |
| 9,798,804 B2 * | 10/2017 | Shimogori ............ G06F 16/683 |

(Continued)

FOREIGN PATENT DOCUMENTS

| CA | 2644666 A1 * | 10/2007 | ........... G06F 40/232 |
| CA | 2784090 A1 * | 3/2013 | ............. G10L 15/26 |

(Continued)

OTHER PUBLICATIONS

Korean Intellectual Property Office, International Search Report for International Application No. PCT/US2020/042211 mailed Oct. 26, 2020.

*Primary Examiner* — Daniel C Washburn
*Assistant Examiner* — Oluwadamilola M Ogunbiyi
(74) *Attorney, Agent, or Firm* — Andrew Graham

(57) ABSTRACT

Systems, devices, and methods transcribe words recorded in audio data. A computer-generated transcript is provided. The transcript comprises records for each word in the computer-generated transcript. At least one confirmation input is received for each record. The at least one confirmation input modifies a selected record and automatically identifies a next record for receiving a next confirmation input. A sequence of confirmation inputs may rapidly modify and validate each record in a sequence of records in the computer-generated transcript. A validated transcript is generated from the modified records and is provided from an evidence management system.

20 Claims, 10 Drawing Sheets

Related U.S. Application Data

(60) Provisional application No. 62/901,074, filed on Sep. 16, 2019, provisional application No. 62/874,501, filed on Jul. 15, 2019.

(51) Int. Cl.
*G06F 40/166* (2020.01)
*G06Q 50/26* (2024.01)
*G10L 15/26* (2006.01)

(56) References Cited

U.S. PATENT DOCUMENTS

| | | | |
|---|---|---|---|
| 11,763,821 B1* | 9/2023 | McNair | G10L 15/22 |
| | | | 704/270.1 |
| 2002/0077833 A1 | 6/2002 | Arons et al. | |
| 2005/0086052 A1 | 4/2005 | Shih | |
| 2007/0239445 A1* | 10/2007 | Kobal | G10L 15/22 |
| | | | 704/E15.04 |
| 2010/0125450 A1 | 5/2010 | Michaelangelo et al. | |
| 2010/0305945 A1 | 12/2010 | Krishnaswamy et al. | |
| 2011/0307252 A1 | 12/2011 | Ju et al. | |
| 2012/0278633 A1* | 11/2012 | Frieder | G06F 21/6245 |
| | | | 713/189 |
| 2013/0066630 A1* | 3/2013 | Roe | G10L 15/26 |
| | | | 704/235 |
| 2013/0259387 A1* | 10/2013 | Gunn | G06V 20/20 |
| | | | 382/218 |
| 2013/0346078 A1* | 12/2013 | Gruenstein | G10L 15/30 |
| | | | 704/235 |
| 2014/0006020 A1 | 1/2014 | Ko et al. | |
| 2014/0032215 A1 | 1/2014 | Bolton et al. | |
| 2015/0058005 A1 | 2/2015 | Khare et al. | |
| 2015/0187355 A1* | 7/2015 | Parkinson | G06F 40/242 |
| | | | 704/235 |
| 2016/0066106 A1 | 3/2016 | Gordan et al. | |
| 2016/0316059 A1* | 10/2016 | Nuta | G10L 15/04 |
| 2017/0085696 A1 | 3/2017 | Abkairov | |
| 2018/0143956 A1* | 5/2018 | Skarbovsky | G06F 40/166 |
| 2018/0144747 A1 | 5/2018 | Skarbovsky et al. | |
| 2018/0240462 A1 | 8/2018 | Allen et al. | |
| 2018/0350390 A1* | 12/2018 | Shellef | G10L 15/01 |
| 2018/0350395 A1 | 12/2018 | Simko et al. | |
| 2019/0108840 A1* | 4/2019 | Sharifi | G10L 15/22 |
| 2019/0121532 A1* | 4/2019 | Strader | G16H 10/20 |
| 2019/0272902 A1 | 9/2019 | Vozila et al. | |
| 2020/0051582 A1* | 2/2020 | Gilson | H04N 21/233 |
| 2020/0053215 A1* | 2/2020 | Kats | H04M 1/72469 |
| 2020/0243094 A1 | 7/2020 | Thomson et al. | |
| 2021/0019213 A1 | 1/2021 | Mestres et al. | |
| 2021/0125004 A1* | 4/2021 | Robert | G06V 10/82 |
| 2022/0005492 A1* | 1/2022 | Donofrio | G10L 17/00 |

FOREIGN PATENT DOCUMENTS

| | | | | |
|---|---|---|---|---|
| CN | 1312542 A | | 9/2001 | |
| GB | 2486038 A | * | 6/2012 | G10L 15/22 |
| KR | 10-2019-0068392 A | | 6/2019 | |
| WO | 201103803 A1 | | 1/2011 | |

\* cited by examiner (a) | *The quick brown fox jumps over the lazy dog.*

(b) The | *quick brown fox jumps over the lazy dog.*

(c) The little | *quick brown fox jumps over the lazy dog.*

(d) The little brown | *fox jumps over the lazy dog.*

(e) The little brown fox | *jumps over the lazy dog.*

(f) The little brown fox likes | *jumps over the lazy dog.*

(g) The little brown fox likes the | *lazy dog.*

(h) The little brown fox likes the lazy dog | .

Fig. 9

METHODS AND SYSTEMS FOR TRANSCRIPTION OF AUDIO DATA

FIELD OF INVENTION

Embodiments of the present disclosure relate to transcribing audio signals captured in audio data.

BRIEF DESCRIPTION OF THE SEVERAL VIEWS OF THE DRAWING

Embodiments of the present disclosure will be described with reference to the drawings, wherein like designations denote like elements, and:

FIG. 9 is a diagram illustrating a user interface of a computing device for validating transcript data according to various aspects of the present disclosure, wherein FIG. 9a-9h each illustrate an example user interface in a different state of transcript validation.

Figure 1:
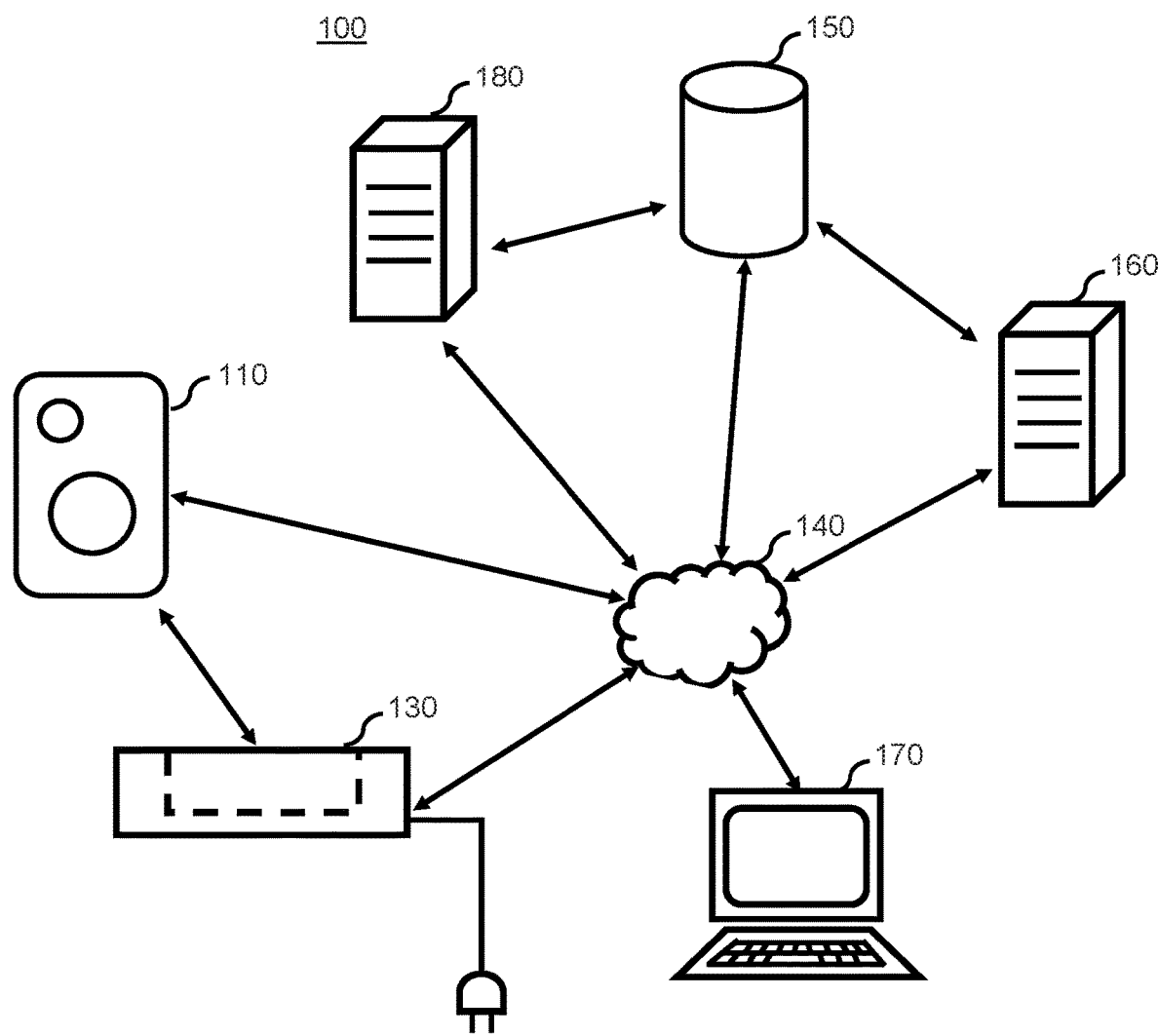
FIG. 1 is a diagram of an example system for generating a validated transcript according to various aspects of the present disclosure.

Body cameras, in-car cameras, wireless microphones, and smart phones have increased the amount of recorded audiovisual information. As used herein, "audiovisual" information, data, or recordings refers to video that includes audio, video that is associated with separate audio of the video scene, or audio alone. The internet, with various video streaming sites, has provided an avenue for posting audiovisual recordings for public viewing. Security agencies (e.g., police forces) not only capture audiovisual recordings, but at times release audiovisual recordings or a portion of an audiovisual recording to the public for viewing. A security agency may also prepare and release an audiovisual recording as evidence for use in a proceeding.

A security agency may release not only an audiovisual recording, but also a written record (e.g., transcript) of the audio portion of the recording. Audio portions of an audiovisual recording may be transcribed in a traditional manner (e.g., by a court reporter, by a transcriptionist) or by a computer (e.g., computer-generated transcription). A transcript includes a written representation of content in the audio portion (e.g., audio data) of the audiovisual recording. Presently, traditional transcripts are generally more accurate than computer-generated transcripts. Traditional transcripts are more accurate as to the semantic translation of sounds into proper words for a particular language. Traditional transcripts are more accurate as to the translation of sounds into proper words for a particular accent. Traditional transcripts are also more accurate as to the translation of sounds into proper nouns associated with a geographical area in which audio data may be captured. A computer-generated transcript may be less accurate for a given language. A computing device configured to generate the computer-generated transcript may not be trained to accurately detect sounds of words in a particular accent or words that are unique to a geographical area. However, computer-generated transcripts may be generated faster than traditional transcripts. Computer-generated transcripts also require fewer inputs to be provided to a computing device to generate computer-generated transcript data representing words detected in audio data. Desirable in the art are methods, systems, and devices for generating transcript data that benefit from both the speed and automation of computer-generated transcripts and the accuracy of traditional transcripts.

Audio data captured during an incident by a law enforcement officer present a particular technological challenge for computer-generated transcripts. The audio data may not be particularly clear due to activity (noise, weather, movement of an audio source, movement of transducer, etc.) occurring concurrently during recording of audiovisual data. The audio data may be recorded from a non-ideal (e.g., offset, distant, unaligned, etc.) position relative to one or more sources of audio signals captured in the audio data. The audio data may be captured closer to a first audio source than a second audio source, resulting in uneven levels of audio signals captured in the audio data. The audio data may not be reviewed until hours later, away from a location of recording, preventing issues with a quality of the audio data from being fixed or otherwise addressed.

Embodiments according to various aspects of the present disclosure address this technology-based issue by generating validated transcript data through a combination of computer-generated transcript data and confirmation inputs. The confirmation inputs are reduced in number relative to inputs otherwise involved with generating a traditional transcript. Such a reduction reduces a number of inputs necessary to provide the traditional transcript, while also decreasing a length of time in which a computing device resource is needed to receive such inputs. Yet, these embodiments retain the accuracy of a traditional transcript by receiving a confirmation input for each word in the computer-generated transcript data. Access and quality control may also be imposed by requiring each word in computer-generated transcript data to be validated prior to release of a transcript of audio data.

Embodiments according to various aspects of the present disclosure further solve a technological problem associated with validating computer-generated transcript data. Validating computer-generated transcript data may comprise operations associated with both deleting an incorrect character in a computer-generated transcript and adding a correct character to the computer-generated transcript. Such operations may be performed using separate input on a user interface device. For example, the incorrect character may be deleted using a first input element on a user interface device (e.g., "delete" key of a keyboard) and the correct character may be inserted using a second input element (e.g. "n" key of the keyboard). Notably, the first input element may be located away from a home position for a user's fingers on a user interface device, requiring an entire hand of the user to change position to actuate the first input element. The hand of the user may be required to change its position from a first position relative to the user interface device to actuate the first input element and then return to the same first position in order to actuate the second input element. Such hand travel may decrease a rate at which computer-generated transcript data may be validated. Embodiments according to various aspects of the present disclosure may preclude a need for such hand travel by enabling a same input element to both delete and insert a character into computer-generated transcript data.

Embodiments according to various aspects of the present disclosure further solve technical problems specific to technical arts of digital transcription. Specifically, computer-generated transcript data may comprise a plurality of records. Various records of the plurality of records may correspond to words inaccurately detected in audio data. To validate the computer-generated transcript data, the various records may need to be both identified and corrected. Checking each record may be an additive task, wherein an increasing amount of the computer-generated transcript data may be reviewed with each record. However, correcting a record is a subtractive task, wherein an incorrect record must be first be reviewed and then, separately, removed before the additive task of checking each record can continue. Subtractive tasks disrupt a workflow of the review and, as noted above, may require changes in hand position that further increase an amount of computing resources necessary to complete the transcription. Embodiments according to various aspects of the present disclosure address these problems by enabling transcripts to be reviewed and modified in an additive manner.

Embodiments according to various aspects of the present disclosure include a system for validating transcript data. The system may include an evidence management system and at least one computing device. The system may also include a transcription server. The system may also include one or more recording devices.

An evidence management system may include at least one server and at least one data store. The server may receive requests and responses related to audio data and transcript data. The server may transmit requests and responses related to audio data and transcript data. The server may execute one more engines to provide one or more functions related to validating transcript data. The server may store audio data and transcript data in the at least one data store.

An evidence management system may collect and manage information. An evidence management system may receive recorded data from one or more recording devices. An evidence management system may receive transcripts from one or more transcript devices. An evidence management system may provide recorded data, transcript data, and/or data that has been processed to a person or entity. An evidence management system may communicate with other systems to transmit and receive data. An evidence management system may include communication circuitry for transmitting and/or receiving data. An evidence management system may use wired or wireless communication protocol for communicating data.

An evidence management system may store data. An evidence management system may store recorded data, transcript data, and/or other data associated with transcript data. The data may be stored in at least one data store. Recoded data may include one or more of audio data or audiovisual data. An evidence management system may store and/or manage data in such a manner that it may be used as evidence in a proceeding, such as a legal proceeding.

An evidence management system may organize stored data according to the recording device that captured the data. An evidence management system may organize stored data according to a particular recorded data (e.g., audio). An evidence management system may further organize stored data according to agencies (e.g., groups, organizations). An evidence management system may group captured data for storage according to the agency to which the person using the recording device used to capture the data is employed.

A computing device includes at least one user interface device and a processing circuit. The user interface device may include a display and at least one input device. The at least one input device may include one or more of a keyboard, touchscreen, mouse, and foot pedal. The processing circuit may receive inputs from the user interface device and perform operations. Examples of computing devices include a first computing device configured to review computer-generated transcript data and receive confirmation inputs and a second computing device configured to request transcript data and receive validated transcript data. The first and second computing devices may be same or different computing devices. Each example computing device may be a local computing device in communication with an evidence management system via one or more networks.

A transcription server may provide text information generated from recorded data. Providing the text information may include receiving indication of the recorded data. Providing the text information may include applying a transcription engine to the recorded data. Providing the text information may include generating the text information by applying a transcription engine to the recorded data. Providing the text information may include transmitting the text information from the transcription server. The provided text information may include computer-generated transcript data.

A recording device generates recorded data. The recording device may capture signals associated with physical properties in an environment and record the signals in memory as recorded data. The recorded data may relate to an incident and may be used as evidence to prove the occurrence of the incident. Capturing the signals may include capturing audio signals and recording the audio signals in memory as audio data. Capturing the signals may include capturing video signals and recording the video signals in memory as video data. The video data and audio data may be captured concurrently. Concurrently captured audio data and video data may be stored as recorded data. In embodiments, recorded data may only include audio data. Data generated by a recording device may be stored in any suitable format, including but not limited to H.264, MPEG-4, AAC, and WAV. The recording device may convert the recorded information from one format (e.g., analog data, encoding) to another format (e.g., digital data, encoding).

A recording device may communicate (e.g., transmit, receive) recorded data. A recording device may transmit recorded data to another system. A recording device may include any conventional communication circuitry for transmitting and/or receiving data. A recording device may use any conventional wired (e.g., LAN, Ethernet) or wireless communication (e.g., BLUETOOTH, BLUETOOTH Low Energy, WIFI, ZIGBEE, 2G, 3G, 4G, WIMAX) protocol.

In embodiments, a recording device may include one or more of a body worn camera, a portable camera, a carried camera, a body-worn microphone, an in-car camera that records audiovisual data, a dashboard mounted camera that records audiovisual data, a portable audio recorder, or other computing device with an audio input transducer by which audio signals may be captured and stored. A recording device may include separate recording devices, such as a digital camera and a wireless microphone that cooperate to perform the functions of a recording device. In embodiments, a recording device may include a computing device installed in an interview room of a law enforcement facility.

FIG. 1 illustrates an example arrangement for transcription of audio data. System 100 includes example devices associated with generating transcript data from an incident according to various aspects of the present disclosure. The recorded data may include audio/visual data. The visual data may include video data. The recorded data including video data may be recorded by camera 110. Camera 110 may be a body-worn camera configured to be worn by a user. A body worn camera, such as camera 110, may be attached to a law enforcement officer to perform recording during an incident. The recorded data may be uploaded (e.g., transmitted) to a server 160 in various ways. The camera 110 may upload the recorded video via a dock 130, which may have a wired and/or wireless connection to server 160 by way of network 140. Alternately, camera 110 may transmit the recorded data directly to the server 160 by way of network 140 via a long-range wireless connection, such as though an LTE communications channel and network. In some embodiments, the server 160 and/or the camera 110 may also transmit the recorded data to data store 150. The recorded data may also be transmitted to a transcription server 180. The transcription server 180 may receive the recorded data and generate transcript data from audio data in the recorded data. In alternate or additional embodiments, server 160 itself may be configured to generate transcript data from audio data in the recorded data. The generated transcript data may be computer-generated transcript data. The transcription server may transmit the transcript data to one or more of data store 150, server 160, and computing device 170. The transcript data, along with the audio data, may be accessible for review at computing device 170. Computing device 170 is a local computing device in communication with one or more of servers 160,180 and data store 150 over network 140. Recorded data and transcript data may be accessible at device 170 via network 140. Devices such as servers 160, 180 and computing device 170 may include various components, including those shown in FIG. 6-7 and/or further discussed below.

While single instances of devices are shown in FIG. 1, embodiments according to various aspects of the present disclosure may include those in which multiple instances of devices are provided, including multiple computing devices 170 or multiple servers 160 or 180. Systems according to various embodiments of the present disclosure may also include different sets of these devices, including those in which one or more devices are duplicated or excluded. Although camera 110 is provided as an example of a recording device and audio/visual data as an example of recorded data, recording devices are not limited to cameras or video cameras and recorded data is not limited to audio/visual data (e.g., information). For example, a recording device according to various aspects of the present disclosure may include audio recorders and other audio-only digital recording devices. Recording devices may also include those that are mounted in other locations, aside from being carried or worn by a law enforcement officer. For example, a recording device may be disposed in an interview room of a law enforcement facility.

In embodiments, audio data may be recorded during a single incident or session. The audio data may include a sequence of words captured chronologically during the incident or session. Capture of audio signals during the incident or session may not be interrupted or otherwise discontinuous. The audio data may be recorded by a same recording device. Each word represented in audio data may be recorded by a same recording device.

Audio data may capture audio signals corresponding to a sequence of words. The audio signals may be captured by a recording device and stored as the audio data. The audio signals may be captured from one or more sources. The sequence of words represented in the audio data may include words captured from one or more sources. The sources may include different persons, also referred to herein as speakers.

Words detected by a transcription device in audio signals of audio data may include suggested words. The suggested words may or may not match the words represented in original audio signals from which the audio data was generated.

Words validated by confirmation inputs at a computing device include confirmed words. The confirmed words match words represented in original audio signals from which associated audio data was generated. The confirmed words may or may not match the suggested words detected by a transcription device for a same portion of the audio data. In embodiments, computer-generated transcript data includes one or more suggested words that match a respective word represented in audio data from which the computer-generated transcript data was generated. In embodiments, computer-generated transcript data includes one or more suggested words that do not match a respective word represented in audio data from which the computer-generated transcript data was generated. Until confirmation inputs are received, all words in computer-generated transcript data may be stored and displayed as suggested words, even if one or more of these words match a respective word originally captured in audio data.

Transcript data may include one or more records. The records may include a sequence of records. A sequence of the records may correspond to a sequence in which the words associated with the respective records were detected in the audio data. Transcript data may include text information. The text information may be included in label information of each record of the one or more records.

Computer-generated transcript data may include transcript data generated by a transcription device. The transcription device may include a transcription server. The transcription device may include a transcription engine executed by a computing device. The computing device may be a server. The computer-generated transcript data may be generated directly from audio data by the transcription device. The computer-generated transcript data may be generated prior to and independent of any confirmation input subsequently received for the computer-generated transcript data. The computer-generated transcript data may reflect words detected in audio data by the transcription device. For example, server 160 and/or server 180 may each be a transcription device configured to generate computer-generated transcript data.

A record in the sequence of records may be associated with a single unit of speech detected in audio data. The single unit of speech may be a word. The record may include data. The data may comprise, represent, correspond to, and/or be indicative of different information. The record may include different data corresponding to each information. The information of a record may include one or more of label information, order information, validation information. The record may be associated with at least one display property. The record may be displayed on a user interface device in accordance with the information or properties included or associated with the record. Data corresponding to each information or property of a record may be stored, transmitted, requested, received, modified, changed, created, or otherwise controlled at or between one or more computing devices in embodiments according to various aspects of the present disclosure. In embodiments, computer-generated transcript data may include more than one hundred records, more than one thousand records, more than two thousand records, more than five thousand records, or more than ten thousand records. In embodiments, records in computer-generated transcript data may correspond to minutes of audio data or tens of minutes of audio data.

A record may be stored in one or more data structures. For example, label information and order information for a record may be stored in a first data structure and display validation information may be stored in a different data structure. The one or more data structures may be stored in one or more databases across one or more data stores, including same or different databases and/or same or different data stores for different information for a record. In embodiments, data representing information of a record may be stored in a tuple.

Label information of a record may include text data. The text data may be associated with a word detected in audio data. The label information may indicate one or more letters or numbers associated with a word with which the record is associated. Displaying a record may include displaying the label information of the record. For example, a record may include label information associated with letters for the word "quick" and displaying the record may include displaying the letters for the word "quick" on a user interface device. Display of the label information for a record may be further changed in accordance with one or more display properties set for the record. The label information for each record may include information for at least one letter, potentially decreasing a number of additional inputs necessary to ensure accuracy of a given record. The label information may be modified upon receipt of a confirmation input.

Order information of a record may indicate a position of the record. The position may be a relative position. The position may be a position relative to one or more other records in a sequence of records. The position may be a position relative to a position in audio data at which a word represented in label information of the record was detected. The order information may include a timestamp. The timestamp may be associated with a relative time in audio data associated with the record. The relative time may be a time in the audio data at which the label information in the record was detected. Order information may link (e.g., tie, associate, align) a record to a location in audio data where a word associated with the record occurs. For example, a unit of speech detected to correspond to the word "quick" may be detected three and zero-tenths seconds into audio data and a record associated with the detected word may include label information with the text data for "quick" and a timestamp indicative of 3.0 seconds.

Validation information in the record may indicate whether a record has been validated. The validation information may indicate a validation status of the record. The validation information may include a binary indication of validated or non-validated. The validation information may indicate whether a word of a record, as represented in label information of the record, is a suggested word or a confirmed word. A suggested word is associated with a non-validated or unconfirmed status for the record and a confirmed word is associated with a validated or confirmed status for the record. All words detected by a transcription device may initially be marked as suggested words in validation information of records for the respective detected words. The validation information may be default validation information associated with a record by one or more of a transcription device, evidence management system, or local computing device. The validation information may be added to a record after it is generated by a transcription device. For example, a transcription device may generate a record with label information and order information, while an evidence management system or local computing device may add the validation information. The validation information may be modified upon or in accordance with a received confirmation input.

A record may have an associated display property. The display property may be included with the record. The display property may be stored in information in the record. For example, a local computing device may receive a record comprising a stored display property and display the record in accordance with the stored display property.

Alternately, the display property may be associated upon processing of information of the record or other related data. The display property may be associated with the record upon display. The display property may be determined at a time of display of the record. For example, a local computing device may associate a display property upon processing of validation information of a record or other data related to a record. The processing may be performed by a viewer application on the computing device.

Other data related to a record that may impart or affect a display property to record may include a current position of playback of audio data associated with a record. Other data related to a record may include whether the record is selected for editing. In embodiments, data regarding whether a record is currently selected may also be stored in validation information for a record, rather than other related data. The processing of the record or the other related data may associate a new display property and/or modify a prior display property associated with a record, including a default display property. The record may be associated with one or more display properties. The display property may include a font, type, size, emphasis, highlighting, or color with which label information of the record is displayed on a display. A display property of a record may be modified in accordance with a confirmation input. A display property may be modified automatically upon receipt of a conformation input associated with a record.

A record may be generated by a transcription device. A transcription device may include one or more of a transcription server and a transcription engine. A record may be generated by transcribing audio data using the transcription device. The transcription device may be configured to receive audio data, process the audio data, and generate transcript data from the processed audio data. Generating the transcript data may include, for example, applying a trained machine learning model to the audio data, wherein an output of applying the trained machine learning model to the audio data is the transcript data. The transcription device may detect one or more words in audio data and generate transcript data comprising a record for each detected word.

The record generated by a transcription device may at least include order information and label information for the record.

A record may be modified in accordance with a confirmation input. The input may be received via a user interface device. The input may be received at a local computing device. The confirmation may be received via a same input device for a plurality of records. For example, a same input element (e.g., actuator, button, key, etc.) on a keyboard may employed to provide a confirmation input for each record in a sequence of records. Use of such a same input element may aid efficiency of validating computer-generated transcript data. A user may repeatedly actuate the same input element to quickly validate a sequence of records, rather than using an irregular series of multiple different elements to select and then confirm or validate a given record. A computing device may efficiently associate a repeated confirmation input to a matching, appropriate record in embodiments according to various aspects of the present disclosure, as the record with which the next confirmation input is associated is established prior to receipt of the confirmation input. A computing device may also efficiently receive inputs and modify records as the next record to be modified is automatically selected upon receipt of a confirmation input for a previous record in a sequence. In embodiments, a single confirmation input both validates a record currently selected and automatically identifies for a computing device a next record for which a next confirmation input may be received.

In embodiments, each confirmation input modifies at least one information record. Alternately stated, every confirmation input modifies an information of a record. Such an arrangement eliminates or at least minimizes a number of input necessary for computer-generated transcript data that do not directly contribute to validation of records in the computer-generated transcript data. Other aspects of transcript validation, such as selecting a word to edit, are automatically managed in embodiments according to various aspects of the present disclosure.

Modification of a record in accordance with a confirmation input may include one or more of a change of the label information of the record, a change in the order information of the record, a change in the validation information of the record, and deletion of the record. The modification may include the addition of information to the record. The modification may be associated with a change in display of the record. For example, a confirmation input may change one or more display properties of a color, font, emphasis, highlighting, position, and text of a record.

In embodiments, a confirmation input us required to be received for every record in a computer-generated transcript data. Each confirmation input may also modify an associated record. Accordingly, each record in computer-generated transcript data is required to be modified. These inputs are required prior to generation of validated transcript data. Such an arrangement ensures accuracy of the resulting transcript data, while minimizing a number of inputs and time needed to produce such accurate results.

After a confirmation input has been received for each record in computer-generated transcript data, validated transcript data may be generated. The validated transcript data may include computer-generated transcript data modified in accordance with received confirmation inputs. The validated transcript data may include a second plurality of records, wherein each record comprises a modified record from a first set of records in the computer-generated transcript data.

Generating validated transcript data may include changing data of a record. The changed data may correspond to information of the record. The change may include changing the label information of the record. For example, text data associated with one or more numbers or letters in text data for the label information may be added, rearranged, and/or deleted. The change may include changing the order information of the record. For example, a record may be merged with another record, resulting in a timestamp of the other record to be added to the record. The change may include changing the validation information of the record. For example, a confirmation input may indicate that the record is confirmed or validated, causing validation information to be added to indicate that the record is validated or confirmed. Alternately, validation information indicative of an unconfirmed status may be switched to indicate a confirmed or validated status for the record. The change may also include deleting a record. The modification may include the addition of a display property to the record and/or be associated with a corresponding change in one or more display properties of the record. For example, a receipt of a confirmation input may correspond to a change of one or more display properties of color, font, emphasis, highlighting, position, and text of a record for which the confirmation input was received.

Modification of a record to generate validated transcript data may include modifying the record at a local computing device. The record may be modified on a same computing device at which a confirmation input associated with the modification is received. For example, a record may be modified at a computing device 170 in the example environment of FIG. 1. The modified record or modified record information may then be transmitted to server 160 of the example evidence management system.

Alternately, a confirmation input associated with a record may be transmitted to a remote computing device and a modification of the record may be applied at the remote computer device. For example, a modification may be applied at server 160 of the evidence management system of FIG. 1, even though the confirmation input is received at computing device 170.

Generating validated transcript data may include receiving modified records of computer-generated transcript data from a local computing device. The modified records may be received at an evidence management system. Validated transcript data may then be transmitted from the evidence management system. Generating the validated transcript data may include transmitting or receiving data comprising label information from the modified records. Generating the validated transcript data may include transmitting indication of one or more of the confirmation inputs and modified record information from a local computing device to an evidence management system. The modified record information may include modified label information and/or modified validation information for each record of a plurality of records. The modified data may be transmitted upon receipt of a specific input at a local computing device. For example, an input associated with a save command may cause modified records or modified record information to be transmitted from a local computing device to an evidence management system.

In embodiments, validated transcript data may include records of computer-generated transcript data that have only modified validation information and records that include both modified label information and modified validation information. Records in the validated transcript data in which only validation information is modified may include same label information as a corresponding record in computer-generated transcript data. For example, a first record in validated transcript data may include a modified validation information and unmodified label information, while a second record that immediately follows the first record according to the order information of each record may have modified validation information and modified label information. A confirmation input is received for each record, though more confirmation inputs are received for the second record in this example.

Figure 2:
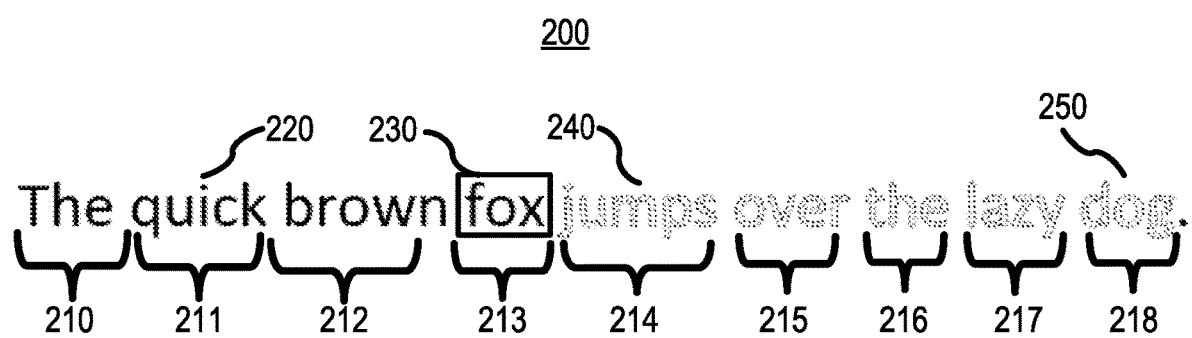
FIG. 2 is a diagram illustrating a user interface of a computing device for validating transcript data according to various aspects of the present disclosure.

FIG. 2 illustrates a user interface of a computing device for validating transcript data according to various aspects of the present disclosure. The transcript data may be displayed, for example, on a display of local computing device 170 shown in FIG. 1.

User interface 200 display a sequence of records. The sequence of records includes records 210-218. Each record is associated with a word. Records may be associated with different types of words. A type of word may be indicated by at least one display property associated with the record. A record may include validation information that causes label information corresponding to the word to be displayed in a manner indicative of the type of word.

For example, record 211 is associated with a confirmed word 220. Record 211 is a record with a confirmed word type. Record 211 includes label information comprising text data of letters that spell the word "quick". The label information of record 211 includes confirmed text. Record 211 includes validation information indicating that the word represented in the label information of record 211 is confirmed word 220. The validation information indicates that a record 211 has a validated or confirmed status. The validation information has been modified relative to when record 211 was initially displayed on the user interface and no further modification of record 211 is necessary. A next confirmation input will not modify record 211. Validation status of record 211 is indicated visually based on a first display property with which confirmed word 220 is displayed. In FIG. 2, a first display property of color is selected as predetermined color of black to visually indicate that a word represented in label information of record 211 is a confirmed word and record 211 has a validated status.

In embodiments, one or more other display properties may be set at a local computing device to visually indicate whether a word of a record is confirmed or unconfirmed and whether an associated record has a validation status of validated or non-validated. A set display property may be stored in a setting which is read by the local computing device to alter an appearance of the record in a predetermined manner. In embodiments, an emphasis may be applied or not applied to indicate a validation status of the record. For example, an emphasis of italics may be removed from a displayed record to indicate that the record has a validations status of validated. Other display properties of emphasis may include an applied or non-applied emphasis of bold and an applied or non-applied emphasis of underlining.

In embodiments, a combination of two or more (e.g., three or more, four or more, etc.) display properties may be selected to indicate a validation status of a record. For example, a validation property of a color and a validation property of a highlighting applied to a displayed record may indicate that a word has a validation status of validated. In the example embodiment of FIG. 2, a color of confirmed word 220 is set to black and a highlighting is not applied to the confirmed word 220 to visually indicate that record 211 has a validation status of validated. As another example, a first display property of an emphasis may be changed (e.g., removed, not applied, etc.) and a second display property relating to color may be changed to a second color from a first color to indicate that a displayed record has a validation status of confirmed. In other examples, a color may be changed to a second color from a first color, an emphasis may be removed, and a highlighting may be removed, wherein a combination of each of these display properties indicates a validation of status of validated for a record and that a confirmation input has been received for the record.

In the example of FIG. 2, records 210 and 212 also have respective associated confirmed words of "The" and "brown". The validation information of each of records 210-212 may be a same validation information. In embodiments according to various aspects of the present disclosure, the validation information of each of records 210-212 has been changed upon receipt of a confirmation input for each record 210-212 via a same input element of a local computing device.

As another example, record 213 is associated with a selected word 230. The label information of record 213 includes selected text information. A position of a selection among a plurality of records is an example of other related data by which a display property of a record may be modified, set, or otherwise selected. Alternately, an indication of the selection may be stored in validation information of record 213. Record 213 is selected such that a next confirmation input received will be applied to record 213. Record 213 includes label information comprising text data of letters that spell the word "fox".

In embodiments, a selected word includes validation information indicative of an unconfirmed word. A selected word may be associated with a record that has a validation status of non-validated. For example, record 213 includes validation information indicating that the selected word 230 is also unconfirmed. A selected, non-validated status of record 213 is indicated visually based on a first display property with which selected word 230 is displayed. In FIG. 2, a display property of highlighting is employed to visually indicate that a word represented in label information of record 213 is a selected word and has a validation status of non-validated. Particularly, highlighting is applied to selected word 230. Other display properties of selected word 230 are set to display label information for record 213; however, application of a predetermined display property or set of display properties may visually distinguish a selected word type from other word types. In the example of FIG. 2, the display property of highlighting supersedes other display properties to indicate that selected word 230 has a selected word type.

In other embodiments, a single display property may be associated with a single information of a record. For example, a display property of color may be associated with validation status in validation information and a display property of highlighting may directly correlate to a selected or non-selected status of a record. Such an alternate arrangement may simplify setting of one or more display properties for records in different states of validation. For example, a one-to-one arrangement would cause record 213 to be displayed with a highlighting applied and a color of gray in the example of FIG. 2.

A next confirmation input received may modify the label information of record 213. Alternately, a next confirmation input received may modify the validation information of record 213. In embodiments, a first confirmation input associated with a first input element may modify validation information of 213. The first confirmation input may be a primary confirmation input as discussed below. A second confirmation input associated with one or more second input elements may modify label information of record 213. The second confirmation input may be a secondary confirmation input as further discussed below. In embodiments, the second confirmation input is received prior to the first confirmation input. In embodiments, at least the first confirmation input for record 213 is necessary to change selected word 230 to a confirmed word. Receipt of the first confirmation input as a next confirmation input may cause word 240 of record 214 to become a selected word and cause selected word 230 of record 213 to become a confirmed word. In embodiments, a selected record may correspond to a first record in a sequence of records in that has validation information associated with an unconfirmed or non-validated status.

As another example, record 214 is associated with an audio aligned word 240. Record 214 includes label information comprising text data of letters that spell the word "jumps" and validation information indicating a non-validated status for record 214. Record 214 also includes order information that matches a position of playback of audio data associated with records 210-218. The playback position is an example of other related data by which a display property of a record may be modified, set, or otherwise selected. An aligned word type corresponds to a word for which a corresponding audio signal may be concurrently output by an audio device. For example, an audio signal on which word 240 was detected and record 214 was generated may be concurrently output by a loudspeaker of a local computing device on which interface 200 is displayed. A position of a playback of audio data may change over time as an audio signal is output, causing a display of a different label to be changed over time. In the example of FIG. 2, record 214 includes order information comprising a timestamp of 5.0 seconds and a playback position of audio data may be five seconds from a beginning of the audio data, causing the word associated with record 214 to have an aligned word type.

One or more display properties may be set to visually indicate an aligned word type. The one or more display properties may be different from display properties associated with a validation status of a record and whether a record is selected. The match between order information and other related data for record 214 is indicated visually based on a first display property with which audio aligned word 240 is displayed. In FIG. 2, a display property of an emphasis of bold is employed to visually indicate that a word represented in label information of record 214 is an audio aligned word and record 214 has order information that matches other related data indicative of a playback position of audio data. Particularly, an emphasis of bold is applied to the displayed letters associated with the label information of record 214. A lack of bold emphasis or non-application of bold emphasis indicates that a word does not have an aligned word type in this example. This single display property is employed to visually indicate an aligned word in this example. This display property may be changed among a sequence of records independent of other information or related data for a given record. This display property may be changed among a sequence of records independent of confirmation inputs that have or have not been received for the sequence of records.

As another example, record 218 is associated with an unconfirmed word 250. Record 218 includes label information comprising text data of letters that spell the word "dog". Record 218 includes validation information indicating that the word represented in the label information of record 218 is an unconfirmed word 250. The validation information indicates that a record 218 has a validated or confirmed status. The validation information has not been modified relative to when record 218 was initially displayed on user interface 200. At least one confirmation input remains required for record 218 in order for validated transcript data to be generated from transcript data comprising records 210-218. Validation status of record 218 is indicated visually based on a first display property with which unconfirmed word 240 is displayed. In FIG. 2, a first display property of color is selected as gray to visually indicate that a word represented in label information of record 218 is an unconfirmed word and record 218 has a non-validated status. In embodiments, a first display property (e.g., color) of a displayed record may be set to one of two states (e.g., color of black or color of gray) in accordance with a validation status in the validation information of the record.

In embodiments, a non-validated status for a record may be further indicated in accordance with a combination of two or more (e.g., three or more, four or more, etc.) display properties may be selected to indicate a validation status of a record. For example, a validation property of a color and a validation property of a particular emphasis may indicate that a word has a validation status of non-validated. In this example, the color may be selected as gray for display of the label information for a non-validated record and the emphasis of italics may also be applied to the label information, wherein the combination of each of these display properties indicates a validation of status of unconfirmed or non-validated for a record for which a confirmation input has not been received. In contrast, a confirmed word in this example may be visually indicated by having a display property of color of black and a second display property of an emphasis of italics not applied.

In the example of FIG. 2, records 215, 216, and 217 also have respective associated unconfirmed words of "over", "the", and "lazy". The validation information of each of records 215-218 may be a same validation information. A confirmation input may not have been received for any of records 215-218.

In embodiments, a record may have a word associated with multiple word types. Particularly, validation information and other related data may cause different word types to be associated with a given record. Combinations of other related data may also cause different word types to be associated with a given record. For example, a record may have validation information indicating that the record is validated and order information indicating that the record is aligned with a playback position of audio data. As another example, a record may have validation information that the record is non-validated and other related data indicating that the record is selected. In another example, a record may be selected, aligned, and either validated or unconfirmed in accordance with validation information, order information, and other related data associated with the record. Each such word type associated with a record may be reflected in a different display property and whether the display property is set to one of two or more states or settings.

Figure 3:
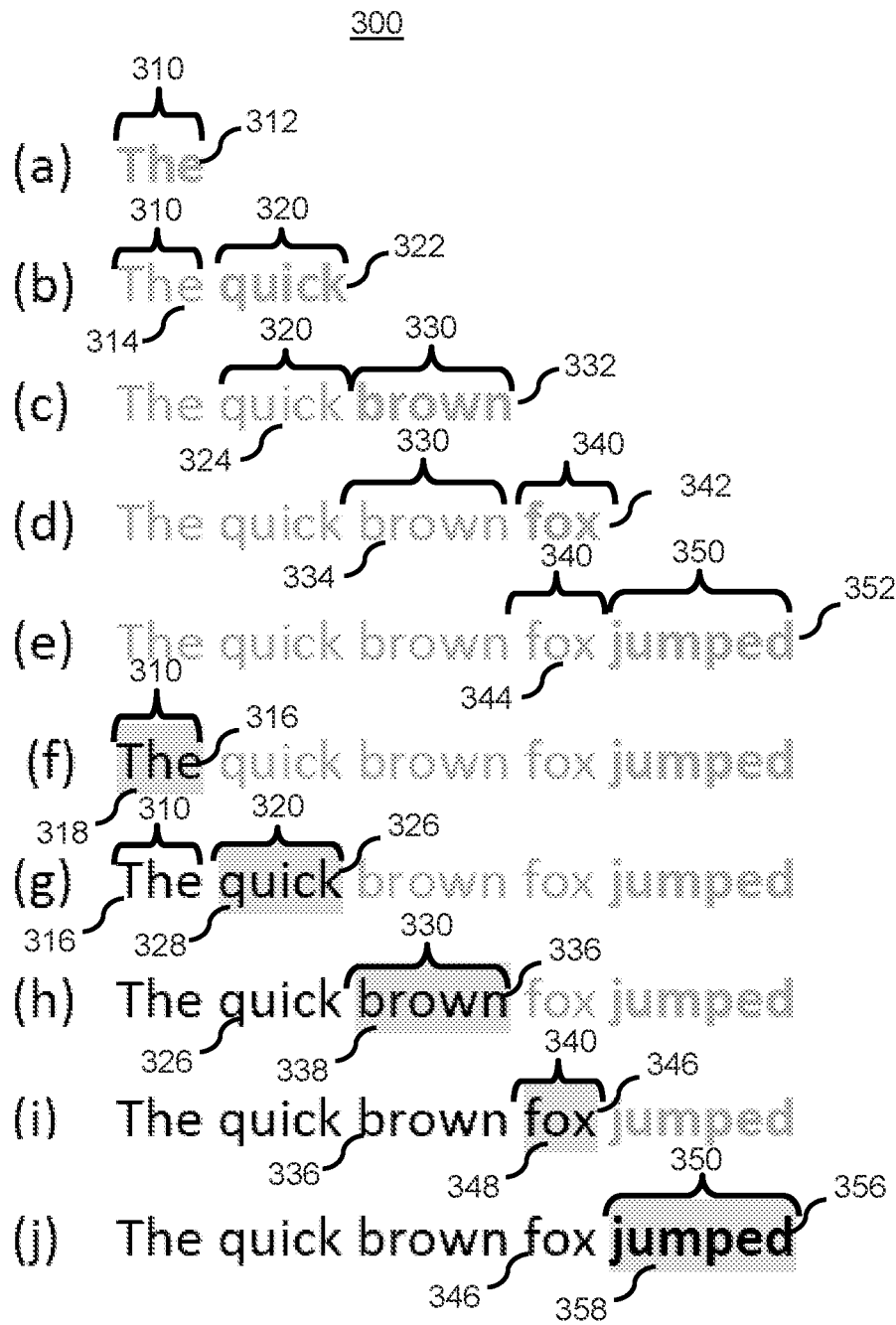
FIG. 3 is a diagram illustrating a user interface of a computing device for validating transcript data according to various aspects of the present disclosure, wherein FIG. 3a-3j each illustrate an example user interface in a different state of transcript validation.

FIG. 3 illustrates a user interface of a computing device for validating transcript data according to various aspects of the present disclosure. FIGS. 3a-3j collectively illustrate an example series of displayed records according to various aspects of the present disclosure, wherein each of FIG. 3a-3j may be displayed one-at-a-time in series from FIG. 3a to FIG. 3j. FIG. 3a-3j each illustrate an example user interface in a different state of transcript validation.

In FIG. 3a-3e, records 310, 320, 330, 340, and 350 are provided. Each of these records may be provided in computer-generated transcript data and displayed one at a time as shown in FIG. 3a-3e. The records 310-350 may be received from a transcription device. The records 310-350 may be provided to a local computing device for display on a user interface device (e.g., screen, display, monitor, etc.) of the local computing device. The records 310-350 may be provided from a server of an evidence management system.

In the example of FIG. 3a, record 310 is displayed first in a sequence comprising records 310-350. Record 310 is displayed first in accordance with order information of the record 310. Record 310 is displayed with a first display property in accordance with validation information for the record. The validation information indicates that record 310 has a validation status of non-validated. Accordingly, label information for record, which comprises text data for the letters "The" is displayed in a predetermined color of gray. A second display property of record 310 is also selected in accordance with order information of the record 310 which indicates that record 310 corresponds to a position of playback of audio data for records 310-350. Particularly, an emphasis of bold 312 is applied to record 310 to visually indicate that audio data corresponding to the label information of record 310 is concurrently being output at a computing device.

Display of record may be initiated by a request to transcribe the audio data from which records 310-350 are generated. A request may be received at a transcription device in response to a request submitted via a local computing device with a user interface device on which FIG. 3 may be subsequently displayed. The received request may be the submitted request or another request provided via an intermediary device, such as an evidence management system. The received request may cause computer-generated transcript data to be provided. The computer-generated transcript data may be provided from the transcription device or transmitted via an intermediate device or system. The intermediate device or system may modify the transcript data from the transcription device, such as by adding validation information to each record in the transcript data. Alternately, the intermediate device may forward the transcript data received from the transcription device as computer-generated transcript data. Upon receipt of the computer-generated transcript data at a local computing device from which the request was received, display of records in the computer-generated transcript data may begin.

Record 320 is displayed after record 310. As shown in FIG. 3b, record 320 is displayed second in a sequence comprising records 310-350. FIG. 3b illustrates an example display of records on a user interface device after and in place of the example display of FIG. 3a. Record 320 is displayed after (e.g., after in terms of timing and in a sequential relative position) record 310 in accordance with order information of record 320 relative to order information of record 310. Record 320 includes label information for the letters "quick". Record 320 includes validation information that indicates that the word with which record 320 is associated is an unconfirmed word. Accordingly, label information for record 320 is displayed in a predetermined color of gray. A second display property of record 320 is also selected in accordance with order information of the record 320 which indicates that record 320 corresponds to a position of playback of audio data for records 310-350. Particularly, an emphasis of bold 322 is applied to record 320 to visually indicate that audio signals corresponding to the label information of record 320 are concurrently being output at a computing device. Between a point in time represented in FIG. 3a and FIG. 3b, a position of playback of the audio data has changed from a position that corresponds to order information of record 310 to a position that corresponds to order information of record 320. In accordance with this change in playback position, a display property comprising a non-bold emphasis 314 has been applied to record 310. Both records 310-320 have a same respective display property with respect to color in accordance with both records 310,320 having same respective validation information.

Initial display of record 320 after record 310 is initially displayed may automatically occur. For example, records in computer-generated transcript data for audio data may be each first displayed in accordance with a playback position of the audio data. A record may be displayed when order information of the record matches a playback position of the audio data. A predetermined property, such as an emphasis of bold, may also be applied to a record as it is displayed as is generally shown between FIG. 3a-3e.

In other embodiments, all records in computer-generated transcript data may be displayed at a same time. In further embodiments, a subset of records in computer-generated transcript data may be displayed at a same time. For example, five words or another number of words less than a number of all records in computer-generated transcript data may be iteratively displayed. The number of records may be N records of M records in computer-generated transcript data, wherein N is less than M (e.g., N<M) or N is substantially less than M (e.g., N<<M). In this latter example, a variable trigger for displaying a next set of N records may be set in accordance with a record in the previous set of displayed N records for which a confirmation input may be received. For example, if five records are displayed at a time, a trigger for displaying a next set of five records of transcript data may be receipt of a confirmation input for the third record in the previous set of five records. Other confirmation inputs for a previous set of displayed records may be used to cause a next set of records to be displayed, including a confirmation input received for a first, middle, or last record of a previous set of records which have been displayed.

In embodiments, a trigger for displaying a next set of records may also be associated with a playback position of audio data. The trigger may be set to display a minimum number of records in advance of a record with an aligned word type. For example, a set of N records may be displayed and a threshold of 0.5 records may be set, where 0.5 is equivalent to a fifty percent of currently displayed records. In such an example, once a playback position of audio advances to or beyond half of the displayed records, a next set of N records may be displayed. Such an arrangement enables records to be displayed in advance of a playback position of the audio data, allowing a user to potentially read a suggested word prior to playback of corresponding audio data in which the suggested word was detected.

Record 330 is displayed after record 320. As shown in FIG. 3c, record 330 is displayed third in a sequence comprising records 310-350. FIG. 3c illustrates an example display of records on a user interface device after and in place of the example display of FIGS. 3b and 3a. Record 330 is displayed after record 320 based on order information of record 330 relative to order information of record 320. Record 330 includes label information for the letters "brown" and includes validation information indicative of a validation status of confirmed for record 330. Accordingly, label information for record 330 is displayed with a predetermined display property for this validation information, which in this example is a predetermined color of gray. In other embodiments, an additional display property may be employed to visually indicate such validation information, such as an emphasis of italics, which may be applied to a word of a record to indicate that the word is an unconfirmed word.

A second display property of record 330 is also selected in accordance with order information of the record 330 which indicates that record 330 corresponds to a position of playback of audio data for the records 310-350. Specifically, an emphasis of bold 332 is applied to record 330 to visually indicate that audio signals corresponding to the label information of record 330 are concurrently being output at a computing device. Between a point in time represented in FIG. 3b and FIG. 3c, a position of playback of the audio data has changed from a position that corresponds to order information of record 320 to a position that corresponds to order information of record 330. In accordance with this change in playback position, a display property comprising a non-bold emphasis 324 has been applied to record 320 as shown in FIG. 3c. Each of records 310-330 have a same respective display property with respect to color, as each of the records 310-330 have a same respective validation information. Initial display of record 330 may occur upon a change in a playback position of audio data for the records 310-350 such that the record 330 appears on the user interface device when the position matches the order information of the record. In the example of FIG. 3a-3e, an ongoing change in a playback position of audio causes records to appear on a user interface device and causes the records to initially appear with a predetermined display property of an applied emphasis of bold.

After record 330 is displayed, a next record in the sequence is displayed. As shown in FIG. 3d, record 340 includes label information comprising text data for the letters in the word "fox", which are displayed on a user interface device with one or more predetermined display properties. Record 340 includes order information indicative that record 340 is after record 330 in the sequence of records 310-350 of the example computer-generated transcript data illustrated in FIG. 3. The order information also indicates that record 330 is aligned with a playback position of audio data associated with the records 310-350, resulting in the display of record 340 with a predetermined display property of an applied emphasis of bold. Record 340 also includes validation information indicative of a validation status of non-validated, resulting in the label information of record 340 being displayed with a predetermined display property of the color of gray. Because of the change in playback position of audio data, record 330 is displayed with a predetermined display property of a non-bold emphasis 334, though this record remains displayed in a predetermined color of gray as no confirmation input has yet been received for this record 330 in the example state of transcription of FIG. 3d.

After record 340 is displayed, record 350 is displayed. As shown in FIG. 3e, record 350 is a next record in the sequence of records 310-350. The order information indicates that records 350 is in sequence after record 340. The order information also indicates that record 350 is aligned with a playback position of audio data. This other related data, comprising the playback position of audio data for the computer-generated transcript data comprising records 310-350, results in record 350 being displayed with a predetermined display property of an emphasis of bold. Record 350 includes label information for the word "jumped" which is displayed with a first display property of a bold emphasis and a second display property of a color of gray because record 350 is unconfirmed. As the playback position of the audio data has shifted to match record 350 in FIG. 3e, record 340 is displayed with a predetermined display property of a non-bold emphasis 344. Each of records 310-350 include a common display property associated with the same validation information for each record, but a different display property of an applied or non-applied emphasis of bold according to a position of playback of audio data from which records 310-350 were generated. A same validation information may indicate both a validation status of non-validated for each record and that each record is not selected. The generation and display of records 310-350 in FIG. 3a-3e may be performed with a single input to initially cause audio data for these records to be transcribed by a transcription device. A conformation input has not been received for any records as shown in FIG. 3a-3e.

After a record is displayed, it may be selected for receipt of a confirmation input. A selected record may be edited. Information of a selected records may be modified, including the label information and validation information. In accordance with modified information, one or more display properties of a record may be changed.

A first record in a sequence of records from computer-generated transcript data may be automatically selected. Other data related to a computer-generated transcript data may indicate a record that is selected in a sequence. In embodiments, the other related data may be stored and updated on a local computing device. In other embodiments, an indication of whether a record is selected or not selected may be included in validation information for a record. In such embodiments, a binary indication may be included in the validation information for the record indicative of whether the record is selected or not selected, along with a binary indication as to whether a record is validated or not validated.

In FIG. 3f, first record 310 is selected. A display property of the record 310 is changed relative to previous displays in accordance with the selection. The display property of highlighting 318 is applied to record 310. In other embodiments according to various aspects of the present disclosure, a different display property may be established to visually indicate a selected or not selected state of a record, as well as a combination of one or more display properties.

In embodiments, a selection of a record may also cause validation information associated with a validation status of the record to also be changed from non-validated to validated. Such information may be changed prior to receipt of a confirmation input for a record. Such a change may cause a corresponding display property for a record to be updated. In these embodiments, the display property is directly correlated with the validation information indicative of the validation status of a record represented in the record's validation information. For example, a second display property of color is set to the color of back for record 310 in the example of FIG. 3f By changing validation information and a display property for a record when the record is selected, indication may be further provided that a next confirmation input received may indicate that the label information of the record is accurate. The change in validation information and corresponding display property may preview potentially confirmed label information in accordance with the changed second display property while the label information remains editable. The change in validation information and display property may provide advance notice to potentially confirmed label information while the label information can still be changed (e.g., altered, edited, retyped, etc.) with one or more confirmation inputs. The concurrent change of two display properties may draw particular attention to a record, thereby ensuring that an appropriate next confirmation input is received.

While record 310 is highlighted, one or more confirmation inputs may be received. A primary confirmation input may cause the record to no longer be selected, which in turn may cause the record 310 to no longer be displayed with a predetermined display property. Receipt of a primary confirmation input may also terminate a period in which one or more secondary confirmation inputs may be received to alter label information for the record. For example, a primary confirmation input may include an input received via a predetermined input element, such as a tab button or arrow key on a keyboard. Receipt of one or more secondary confirmation inputs may include one or more inputs received via one or more alphanumeric keys on a keyboard. For example, label information of a record may be changed to include the letter "a" if a secondary confirmation input from the "a" key on a keyboard is received while the record is selected. A sequence of secondary confirmation inputs may be received while a record is highlighted. For example, inputs from a keyboard associated with letters "a", "x", "o", and "n" may be received and added to label information of a record if keys on a keyboard corresponding to these letters are received while a record is highlighted. In these examples, each of the primary and secondary confirmation inputs may be received via a keyboard, enabling a user to keep their hands on a keyboard interface device and thus decreasing an amount of travel necessary for the person's hands to complete a transcription validation task. A decreased amount of travel may save time to complete a task, particularly in the context of a computer-generated transcript data that is thousands or tens of thousands of records in length.

In other embodiments, selection of a next record may not change validation information of a record associate with validation status. Rather, the validation status may remain non-validated until a confirmation input is received for the record. In such embodiments, a display property associated with validation status may continue to correspond to a setting of the display property associated with a non-validated status. For example, if a display property of a color of black is associated with confirmed records and a display property of a color of gray is associated with unconfirmed words, a selected record may continue to be displayed in the color of gray until a confirmation input is received for the record. The selected word may continue to be displayed with a predetermined display property associated with a selection status, such as an applied highlighting as shown in FIG. 3f.

In other embodiments, selection of a next record may cause a display property of a record to change to third setting. For example, if a display property of a color of black is associated with confirmed records and a display property of a color of gray is associated with unconfirmed words, a selected record may be displayed with a display property of a color of blue, visually indicating that the selected record is in the process of being changed from unconfirmed to confirmed. In such embodiments, a display property may have a different setting for each different type of record, rather than a display property being specifically indicative of a subset or single information of a record.

In other embodiments, a second display property may not be directly correlated with a single, specific validation information. Alternately stated, a display property may not reflect a given validation information in a one-to-one manner. For example, a second display property of a selected record may change prior to a change in validation information for a record. Rather than being directly tied to one of two binary states of a validation status in validation information, a display property such as color may be set to a predetermined state (e.g., color) if a record is either selected or validated. When validation information of a record includes data for both whether a record is selected and whether a record is validated, a display property may be change in accordance with a state of at least one part of this validation information. In embodiments according to various aspects of the present disclosure, a record may always be marked as validated after being selected. Accordingly, a change in a display property that is applied to a record prior to receipt of a confirmation input for the record may provide advance visual indication of an impending change in validation status as noted above.

In embodiments, a second display property of a record may also be changed or updated upon selection of a record. In FIG. 3f, a second display property of color 316 of record 310 is also set to a color of black. As noted above, such a change in display property may correspond to a change in a validation status in validation information for record 310 or provide advance notification that the validation status may be changed upon receipt of a next confirmation input. In FIG. 3f, a second display property of color for the other records in the computer-generated transcript data is set to a different color relative to that of record 310, as these records have different associated other data or validation information relative to that of record 310.

Upon receipt of a confirmation input, a next record in a sequence of records of computer-generated transcript data may be selected and a previously selected record in the sequence may no longer be selected. In FIG. 3g, record 320 is selected and record 310 is no longer selected. Validation information of record 310 indicates that record 310 is associated with a confirmed word and record 310 has a validation status of validated. Other related data or validation information of record 320 indicates that record 320 is selected. Accordingly, a display property of color 316,326 is set to a predetermined color of black for both records, but a display property of highlighting 328 is applied to record 320 but has been removed or is no longer applied to record 310.

Change from the displayed user interface of FIG. 3f to the user interface of FIG. 3g may be caused by receipt of a confirmation input while the interface of FIG. 3f is displayed and record 310 is selected. Particularly, receipt of a confirmation input comprising a primary confirmation input causes a next record to be selected in a sequence of records. In embodiments, a primary confirmation input may be received via a same input element for one or more records in computer-generated transcript data. The one or more records may include many, most, or all records in a sequence of records of the computer-generated transcript data. The same input element may include a single input element, such as a tab or arrow key on a keyboard.

In embodiments, a primary confirmation input may be received via a limited set of elements. The limited subset may include non-alphanumeric keys on a keyboard user interface device. For example, the limited subset may include an arrow key and a tab key on a keyboard.

In a state of transcription validation illustrated in FIG. 3g, no confirmation inputs are required for record 310. For example, no secondary confirmation inputs may be received to modify label information of record 310. Rather, next confirmation inputs will be applied to record 320 to change label information of record or cause record 320 to no longer be selected, indicating that record 320 should have a validation status of validated. In certain embodiments, a next confirmation input may change a validation status in validation information for record 320 if such validation information was not changed upon selection of record 320. Records subsequent record 320, for which no confirmation inputs have been received, have a display property set to a different state relative to records 310 and 320. Particularly, the other records 330-350 have a display property of color set to gray, while this display property 316,326 of records 310,320 is set to a color of black. Records subsequent record 320 may also include validation information or may be associated with other related data that indicates that these records are non-selected, same as record 310 in FIG. 3g.

Upon receipt of a second confirmation input, a next record in a sequence of records of computer-generated transcript data may be selected and a previously selected record in the sequence may no longer be selected. The second confirmation input may be a second instance of a primary confirmation input. In FIG. 3h, record 330 is selected and record 320 is no longer selected and record 310 remains non-selected. Validation information of records 310,320 indicate that these records 310,320 are associated with respective confirmed words and the records 310,320 each have a validation status of validated. Other related data or validation information of record 330 indicates that record 330 is selected. Accordingly, a display property of color 316,326,336 is set to a predetermined color of black for each of these records 310,320,330, but a display property of highlighting 338 is applied to record 330 but has been removed or is no longer applied to record 320.

Change from the displayed user interface of FIG. 3g to the user interface of FIG. 3h may be caused by receipt of a confirmation input while the interface of FIG. 3g is displayed and record 330 is selected. Particularly, receipt of a confirmation input comprising a primary confirmation input causes a next record to be automatically selected in a sequence of records. Accordingly, a user interface device may be rapidly changed from FIG. 3f to FIG. 3h upon repeated input of confirmation inputs via a same input element.

In a state of transcription validation illustrated in FIG. 3h, no confirmation inputs are required for record 320. For example, no secondary confirmation inputs may be received to modify label information of record 320. The label information of record 320 is considered to correspond to a confirmed word. Instead, one or more next confirmation inputs will be applied to record 330 to change label information of record or cause record 330 to no longer be selected, indicating that record 330 should have a validation status of validated. In certain embodiments, a next confirmation input may change a validation status in validation information for record 330 if such validation information had not been changed upon selection of record 330. Records subsequent to record 330, for which no confirmation inputs have been received, have a display property set to a different state relative to records 310, 320, 330. Particularly, the other records have a display property of color set to gray, while this display property 316,326,336 of records 310,320,330 is set to a color of black.

Upon receipt of a third confirmation input, a further next record in a sequence of records of computer-generated transcript data may be selected, while a previously selected record in the sequence may concurrently be deselected. The third confirmation input may be a third instance of a primary confirmation input. In FIG. 3i, record 340 is selected and record 330 is no longer selected. In this example, records 310 and 320 each remain non-selected as reflected in other related data for records 310-350 or validation information for each record. Validation information of records 310,320, and 330 indicate that these records 310,320, 330 are associated with respective confirmed words and the records 310,320, 330 each have a validation status of validated. Other related data or validation information of record 340 indicates that record 340 is selected. Accordingly, a display property of highlighting 348 is applied to record 340 but has been removed or is no longer applied to record 330 and a display property of color 316,326,336, 346 is set to a predetermined color of black for each of these records 310,320,330,340.

A change in the validation information and display properties reflected on FIG. 3i relative to FIG. 3h are caused by a confirmation input received while the interface of FIG. 3h is displayed and record 340 is selected. No confirmation inputs are required or may be further received for record 330. A next confirmation input received will automatically be applied to information of record 340. A next confirmation input may change a validation status in validation information for record 340 if the validation information of record 340 was not altered upon selection of record 340. The last record in the sequence retains a display property set to a different state relative to records 310, 320, 330, 340. Particularly, the last record in the illustrated sequence has a display property of color set to gray, while this display property 316,326,336, 346 of records 310,320,330 has been changed from gray to a color of black.

Upon receipt of a fourth confirmation input, a next record in a sequence of records of computer-generated transcript data may be selected, while a previously selected record in the sequence may concurrently be deselected. The fourth confirmation input may be a fourth consecutive instance of a primary confirmation input. In FIG. 3j, record 350 is selected and record 340 is no longer selected. Each of the records prior to record 350 remain non-selected. The non-selection of these records 310,320,330,340 is reflected in other related data or in respective validation information for each record 310,320,330,340. A respective confirmed word is associated with each of records 310,320,330,340 as indicated in validation information for each of 310,320,330,340. Other related data or validation information of record 350 indicates that record 340 is selected. Accordingly, a display property of highlighting 358 is applied to record 350 but has been removed or is no longer applied to record 340. A display property of color 316,326,336,346,356 is set to a predetermined color of black for each of these records 310,320,330,340,350. As noted above, the change in the display property of record 350 may reflect that record 350 is selected or that validation status in validation information for record 350 has been changed in different embodiments according to various aspects of the present disclosure. Record 350 also retains an emphasis of bold 432 in accordance with a playback position of audio data for the illustrated records of FIG. 3. A first display property of record 350 in FIG. 3j matches the other records in FIG. 3j, while second and third display properties of record are set to different states or values respective validation information or other related data for the records.

A change in the validation information and display properties reflected on FIG. 3j relative to FIG. 3i are caused by a confirmation input received while the interface of FIG. 3i is displayed and record 350 is selected. No confirmation inputs are required for records 310,320,330,340. A next confirmation input received will automatically be applied to information of record 350. A next confirmation input may change a validation status in validation information for record 350 if the validation information of record 350 was not altered upon selection of record 350. A next confirmation input comprising a secondary confirmation input will change label information of record 350. A next confirmation input comprising a primary confirmation input will cause record to be deselected and a display property of highlighting 358 will no longer be applied to record 350. Accordingly, a repeated, consecutive input of a same primary confirmation input may be received for records 310,320,330,340,350 to rapidly modify (e.g., change or add) a validation status for each of these records. Five confirmation inputs may be received, wherein each confirmation input is associated with a respective one of records 310, 320, 330, 340, and 350. A same confirmation input may be repeatedly received for each individual record in computer-generated transcript data. A same confirmation input may be repeatedly received after each record in the computer-generated transcript data is selected. The same repeated consecutive confirmation input may also alter multiple different display property for each of the records as described above.

In embodiments, confirmation input may include a primary confirmation input. The primary input may include one or more input elements on a user interface device. For example, the inputs may be non-alphanumeric input elements on a keyboard. These inputs may also lack information regarding a position on a display. These input elements may not include location information. For example, input from a tab key does not expressly indicate, convey, or otherwise include location information. However, other types of inputs from user interface devices may include location information. For example, a touchscreen or input of a pointer controlled by a computer mouse, trackball, other graphical user interface input device may include location information as well as a signal associated with the actuation of the input device itself. In embodiments according to various aspects of the present disclosure, primary confirmation inputs may also include inputs that comprise location information.

For example, while FIG. 3*f* is displayed, a primary confirmation input comprising location information that corresponds with a location of record 350 may be received. The primary confirmation input may include a mouse click on a location at which record 350 is displayed. The primary confirmation input may include an actuation of sensor of a touchscreen at a location at which record 350 is displayed. In this example, a selected record for transcription validation may become record 350 and each of records 310, 320, 330, and 340 may be modified to indicate that each of these records 310,320,330,340 are associated with confirmed words. A next display on a user interface device may be FIG. 3*j*, rather than each of FIG. 3*g*-3*i*. Upon receipt of such a primary confirmation input, a previously selected record may be modified such that validation information of the previously selected record has a validation status of validated. For example, record 310 would be marked as validated if record 350 has a position that matches location information of received primary confirmation input. Upon receipt of such a primary confirmation input, each record between a previously selected record and a record associated with a location of the received confirmation input may also be modified such that validation information of each of these record(s) may also indicate a validation status of validated. For example, record 310,320,330, and 340 would each be marked as validated if record 350 has a position that matches location information of a received primary confirmation input in the transcript validation state of FIG. 3*f*. Multiple display properties may be changed and validation information from multiple records may be changed upon receipt of a single confirmation input. Such an arrangement enables a primary confirmation input to be received and associated with each of a plurality of records in a sequence through receipt of a single confirmation input. Such an arrangement also reduces an amount of time necessary for validating each record in computer-generated transcript data and also reduces a number of confirmation inputs that are required to be received and processed to generate validated transcript data for a plurality of records.

In embodiments, a confirmation input may also include a navigational confirmation input. A navigational confirmation input may enable a new record to be added to a sequence of records of computer-generated transcript data. A navigational confirmation input may include an arrow key. For example, a navigational confirmation input may correspond to an input received via a left arrow key. Receipt of a navigational confirmation input while a record is selected may cause a cursor to be placed between the selected record and a previous record. Secondary confirmation input may be received. The secondary confirmation input may include an input corresponding to a punctuation mark. Order information may be created for the new record to indicate a position of the new record relative to the selected record and the previous record. Receipt of a primary confirmation input may cause the selected word to again become a next record to which a primary or secondary confirmation input is applied upon receipt. This allows user to insert a word or punctuation as desired.

In embodiments, a confirmation input may include a master confirmation input. A master confirmation input may include a combination of inputs from particular input elements of a user interface device that are received at a same time. The combination of inputs may include input elements associated with two or more non-alphanumeric inputs. For example, the combination may include concurrently received inputs from command and right arrow keys on a same keyboard of a local device. Alternately, the combination may include concurrently received inputs from a control and right arrow keys on a same keyboard of a local device. A master confirmation input may cause all displayed records to be validated. A master confirmation input may cause a last displayed record to be selected. Additional records from computer-generated transcript data may also be displayed upon entry of a master confirmation input.

In embodiments, a confirmation input may include a speaker confirmation input. A speaker confirmation input may include a predetermined input element. For example, a return key and an input received via return key on a keyboard may be associated with a speaker confirmation input. Upon receipt, a speaker confirmation input may place a selected record on a new line on a user interface device. The selected record is not deleted. An additional record may also be added to the sequence of records indicating that a new line has been added to the computer-generated transcript data. The new record may include text data indicating a speaker or person from which audio signals were captured in audio data. In embodiments, each entry of a speaker confirmation input may create a new record that is alternately associated with different speakers, such as via "first speaker" and a "second speaker" being alternating listed in label information for each new record created in response to a speaker confirmation input. In embodiments, each of the primary confirmation input, one or more secondary confirmation inputs, master confirmation input, navigational confirmation inputs, may be associated with different, distinct input elements on a user interface device. For example, different keys on a single keyboard may be mapped to a single one of these confirmation inputs, providing a user with extensive transcription control and capabilities for transcription through the use of a single input device.

While example display properties are discussed with respect to FIG. 3 and different types of words and different records, other display property and combinations of display properties may also be employed according to various aspects of the present disclosure. Display properties may specifically be changed between different settings for different information, binary settings for binary information or three or more settings for each of three or more different information. In embodiments, a combination of display property may also be associated with a word type or type of record, rather than different individual information of the record, such that a single information of a record may cause multiple different settings to be applied in accordance with the word type or type of record. For example, a selected record may only have one display property that changes when the record is selected, such as an emphasis of highlighting. Alternately, multiple different properties may be changed to different settings when a record is selected, such as a display property of color being set to blue and an emphasis of highlighting being set to 'on' or applied to the label information of the record.

In embodiments according to various aspects of the present disclosure, a confirmation input may include one or more secondary confirmation inputs. A secondary confirmation input may not change a selected record. A secondary confirmation input may change label information of a currently selected record, rather than other information of the record or other data related to the record. A secondary confirmation input may include data indicating one or more alphanumeric characters. For example, a secondary confirmation input may include one of letters "a" to "z" or a number between 0 and 9. Alphanumeric information of a secondary confirmation input may be added to label information of a selected record. The alphanumeric information may be added prior to receipt of a primary confirmation input for the record. The alphanumeric information may be applied to the label information of a record while the record is selected. The one or more secondary confirmation inputs may only be applied to a selected record. Secondary confirmation inputs enable incorrect information in a computer-generated transcript data to be corrected. After one or more optional secondary confirmation inputs are received, a primary confirmation input may be received to discontinue application of secondary inputs to a current record and select a next record for optional receipt of one or more secondary confirmation inputs. The set of input elements for a primary confirmation input may be distinct from a set of input elements for the one or more secondary confirmation inputs.

Figure 4:
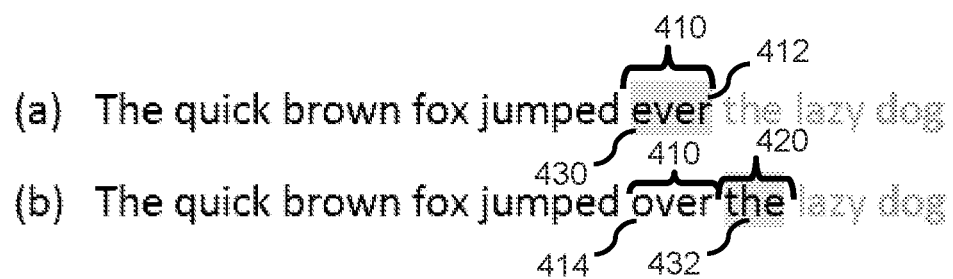
FIG. 4 is a diagram illustrating a user interface of a computing device for validating transcript data according to various aspects of the present disclosure, wherein FIG. 4a-4b each illustrate an example user interface in a different state of transcript validation.

FIG. 4 is a diagram illustrating a user interface of a computing device for validating transcript data according to various aspects of the present disclosure, wherein FIG. 4a-4b each illustrate an example user interface in a different state of transcript validation. In FIG. 4a, record 410 is selected. The selection may be indicated in validation information. A display property of highlighting 430 is applied to record 410. The validation information may also indicate that record 410 is non-validated. Records prior to record 410 are associated with confirmed words and records after record 410 in the displayed sequence are associated with unconfirmed words. Record 410 includes label information 412 with text data that spells the word "ever". However, audio data from which record 410 was generated had captured the word "over", not "ever".

To address this error, secondary confirmation inputs corresponding to the letters in the word "over" are received, followed by a primary confirmation input. As a result of these next confirmation inputs, record 410 is modified. Record 410 is modified as displayed in FIG. 4b, wherein a label information of record 410 includes the letters for the word "over" and a next record 412 is selected and displayed with a display property of highlighting 432. In other embodiments, one or more secondary confirmation inputs may include inputs associated with fewer letters, such as a single letter to fix a single letter error. The number of secondary inputs may equal a number of alphanumeric errors in label information. In embodiments, a secondary confirmation input may also include an input for deleting a letter in text data. In embodiments, a secondary confirmation input may also include an input for deleting an entire record.

Figure 5:
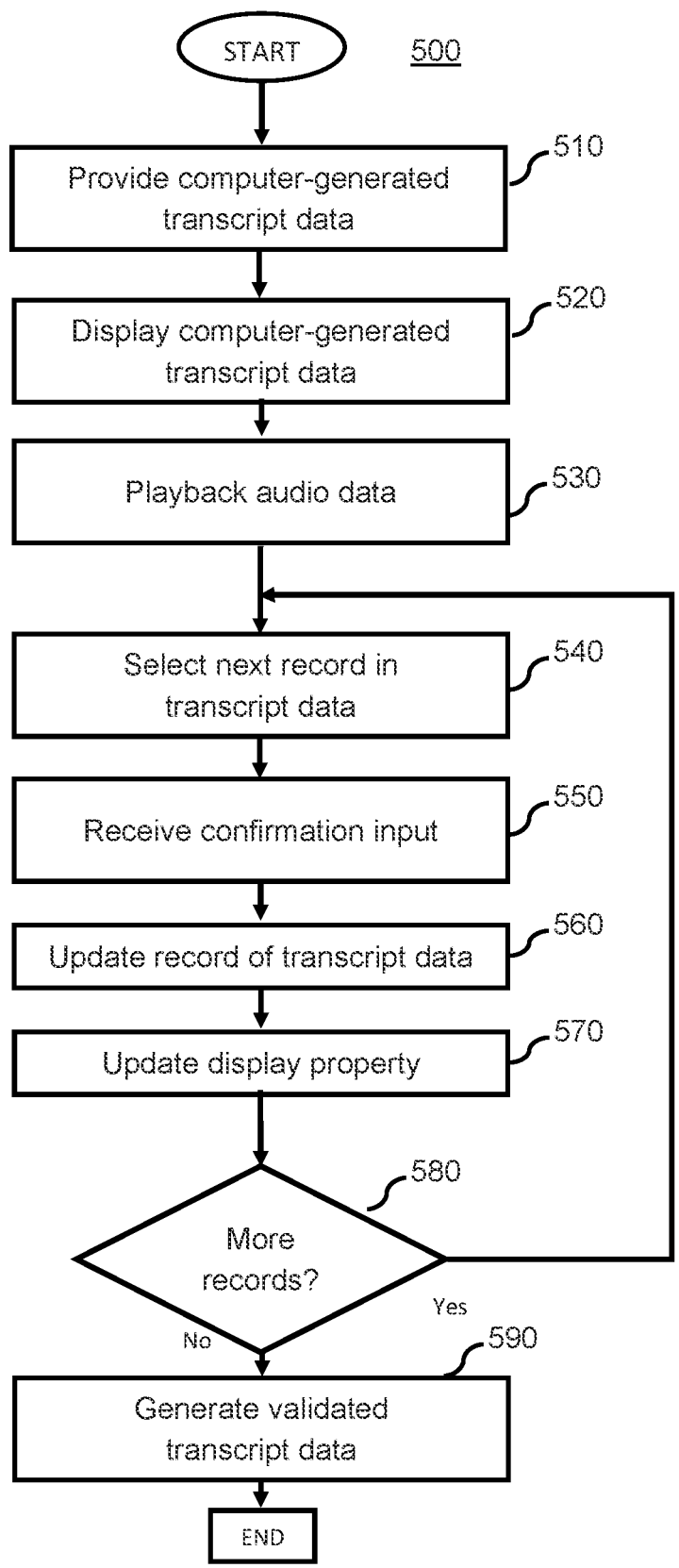
FIG. 5 is a flowchart illustrating an example method for validating transcript data according to various aspects of the present disclosure.

FIG. 5 is a diagram of an example method for validating transcript data according to various aspects of the present disclosure. Method 500 may be executed on one or more computing devices. For example, method 500 may be executed on an evidence management system or a combination of an evidence management system and a local computing device. In embodiments, a non-transitory computer readable medium may have stored thereon instructions for generating validated transcript data according to method 500. When these instructions are executed by one or more computing devices, they may cause the one or more computing devices to perform one or more operations associated with blocks of method 500.

After starting, method 500 proceeds to block 510. At block 510, computer-generated transcript data is provided. Providing the computer-generated transcript data may include generating the computer-generated transcript data. The computer-generated transcript data may be generated by a transcription device. The transcription device may include one or more of a transcription server and a transcription engine executed on a computing device. The computer-generated transcript data may be provided by an evidence management system. The computer-generated transcript data may be received by a local computing device.

In embodiments according to various aspects of the present disclosure, the computer-generated transcript data includes a plurality of records, each record associated with a word detected in the audio data. The computer-generated transcript data may include a first record associated with a first word and a second record associated with a second word, the first word and second words associated with different portion of the audio data. The first word may be detected chronologically earlier than the second word in the audio data. The records may be provided in a sequence corresponding to an order in which a respective word associated with each record was detected in the audio data. In embodiments, each record may include label information for a different word in the plurality or sequence of suggested words, order information indicative of a position of the respective record relative to other records in the plurality of records, and validation information associated with validation status of the respective record. The validation information for a record may include an indication of whether the record is selected or not selected and whether the record is validated or non-validated. In embodiments, each record may also have one or more associated display properties. A display property may be stored in the record or associated at a local computing device in accordance with information of the record or other related data for the record. The computer-generated transcript data may be provided for display. In embodiments, providing the computer-generated transcript data comprises transmitting the computer-generated transcript data to a local client device for display. Providing the computer-generated transcript data may comprise displaying the computer-generated transcript data on a display of a computing device.

At block 520, the provided computer-generated transcript data is displayed. The computer-generated transcript data may be displayed on a computing device. The computing device may be a local computing device in communication over a network with a server from which the computer-generated transcript data was received. Displaying the computer-generated transcript data may include displaying the records of the computer-generated transcript data. Each individual record may be displayed. Displaying the records may include displaying each record in accordance with the label information and the validation information of the respective record. Displaying a record in accordance with the validation information of the record may include selecting one or more of a font, type, size, emphasis, or color of the label information of the record. A setting may be selected, stored, or otherwise applied to display a record with a given display property. Displaying the computer-generated transcript data includes displaying all words associated with the computer-generated transcript data as suggested words. Displaying the computer-generated transcript data may include displaying all words associated with the computer-generated transcript data with an unconfirmed validation status. The words may be initially displayed on a display of a computing device with such a validation status. The unconfirmed status may be a default status of each record in computer-generated transcript data. Displaying the computer-generated transcript data may include displaying each record in the computer-generated transcript data with a same setting for a predetermined display property. The same setting may be indicative of an unconfirmed validation status for each record. Each record may have a same validation information at block 520, prior to receipt of any confirmation inputs, including a first confirmation input of subsequently received confirmation inputs.

In embodiments, displaying the computer-generated transcript data includes setting a first display property of a record in accordance with validation information of the record. The first display property may include a color in which the record is displayed. A second display property may also be set in accordance with validation information of the record, the second property different from the first property. The second display property may include a first emphasis with which the record is displayed. In embodiments, displaying a computer-generated transcript data may include setting a third display property of a record in accordance with whether the record is selected. The third display property of a record may alternately or additionally be set in accordance with whether label information of the record is editable. Whether a record is selected and/or editable may be included in validation information of the record. The third display property may include a highlighting of the record. Displaying the computer-generated transcript data may also include setting a fourth display property of a record, different from other display properties of the record. The fourth display property may be set in accordance with whether a playback position of audio data corresponds to order information of the record. The fourth display property may include a second emphasis of the record. Displaying the computer-generated transcript data may include automatically selecting a first record of the plurality of records. A single record of the records may be selected at a time. A record may be selected and a display property of the record may be set separate from identifying a record associated with a current playback position of the audio data.

In embodiments, all records in computer-generated transcript data may be displayed at a same time at block 520. Alternately, displaying the computer-generated transcript data may include displaying N records of the computer-generated transcript data at a time, the computer-generated transcript data including M records and M>N. In embodiments, N may be equal or less than ten. Displaying the computer-generated transcript data may include displaying ten or fewer records in sequence ahead of a selected record. Displaying the computer-generated transcript data may include displaying ten or fewer records in sequence ahead of an aligned record. Between five and fifteen records may be displayed ahead of a selected or aligned record. Displaying the computer-generated transcript data may include displaying a first set of records of the computer-generated transcript data and then displaying a second set of records of the computer-generated transcript data after confirmation inputs have been received for each record in the first set of records. The records may be displayed in a sequence in accordance with order information associated with each record. Displaying computer-generated transcript data at block 520 may include displaying at least a first set of records of the computer-generated transcript data.

At block 530, audio data from which the computer-generated transcript data was generated may be played back. The audio data may be provided for playback at a computing device. For example, the audio data may be provided for playback from an evidence management system to a local computing device. Alternately or additionally, the audio data may be provided for playback from a computing device to a user interface device. The user interface device may include one or more audio components configured to transduce the audio data into sound. For example, the audio components may include one or more of a decoder, digital-to-analog transducer, and a loudspeaker. In embodiments, the audio data may be output on a loudspeaker in communication with a computing device on which the computer-generated transcript data is displayed. The audio data may be output or played back concurrently with the display of words or records of the computer-generated transcript data. A position of the playback of the audio data may be tracked as other data related to computer-generated transcript data. The position of playback, or audio position, may be tracked in parallel with other operations of a computing device according to various aspects of the present disclosure. The position may be used to modify a display property of records in accordance with order information of each of the records. Audio playback may be started, stopped, and repeated throughout a process for validating computer-generated transcript data.

At block 540, a next record may be selected. At a first instance of block 540, a first record in a sequence of records of the computer-generated transcript data may be selected and settings for one or more display properties of the first record may be applied in accordance with information of the record. Selecting a record may include updating one or more of validation information of the selected record and other related data for the record. The validation information may be updated to indicate that the selected record is selected. Selecting a record may also include changing validation information or other related data for a previously selected record to indicate that the previous record in the sequence is no longer selected. Selecting a record may also changing one or more display properties for the selected record and a previous record in accordance with the changed validation information or other related data for the records.

At block 550, a confirmation input may be received. The confirmation input may be received via a user interface device. The confirmation input may be received via an input element of the user interface device. In embodiments, each confirmation input at block 550 may be received via a same user interface device, thereby enabling the confirmation input to be rapidly received from a same physical input device, including many or most confirmation inputs from a same input element. The received confirmation input may be applied to the record selected at block 540. The confirmation input may modify a single record of the computer-generated transcript data.

Receiving a confirmation input may include receiving a primary confirmation input. A primary confirmation input may indicate that label information of a selected is accurate with respect to a word captured in audio data. The primary confirmation input may be associated with a single record. The primary confirmation input may be received via a single predetermined input element on a user interface device. The input element may be a same key on a keyboard. The primary confirmation input may alter validation information of the selected record. The primary confirmation input may modify a validation status of a record. The primary confirmation input may change a validation status from non-validated to validated. The primary confirmation input may not modify validation information or order information of the record.

As shown in FIG. 5, multiple instances of block 550 may involve receipt of multiple primary confirmation inputs. Accordingly, receiving a primary confirmation input may include receiving a first primary confirmation input associated with the first record during a first instance of block 550 and receiving a second primary confirmation input associated with a second word during a subsequent instance of block 550, wherein the first primary confirmation input and second primary confirmation input are received via a same input element on a user input device. As noted above, the same input element may include one of a key on a keyboard, a button on a mouse, a pedal on a foot pedal, and a same actuator on a same user input device.

Receiving a confirmation input may include receiving one or more secondary confirmation inputs. Receipt of one or more secondary confirmation inputs may indicate that label information of a selected is inaccurate with respect to a word captured in audio data. Each secondary confirmation input may be associated with a single, currently selected record. Each secondary confirmation input may be received via one or more different input elements on a user interface device. The different input elements may be separate from the predetermined input element associated with a primary confirmation input. The different input elements may be associated with one or more letter or numbers. The different input elements may be different keys on a same keyboard. Each secondary confirmation input may alter label information of the selected record, though not modify validation information of the selected record. A validation status of a selected record may not be altered by the received one or more secondary confirmation inputs. Text data of label information of a selected record may be modified in accordance with the received one or more secondary confirmation inputs. Receipt of secondary inputs is optional for each record, whereas a primary confirmation input is mandatory for each record in computer-generated transcript data. A primary confirmation input must be received after any secondary confirmation input for a record and a secondary confirmation input may not be received for a record after a primary confirmation input has been received for the record. A master or navigational confirmation input may also be received at block 550. In embodiments, a confirmation input with location information may be received.

At block 560, information of a record is modified in accordance with the received confirmation input. The modified record is the selected record. Modifying the record may include changing the validation information associated with the record. For example, a validation status of a record may be altered in accordance with a received primary confirmation input. Label information of a record may also be changed in accordance with a received confirmation input. For example, label information of a record may be altered in accordance with a received secondary confirmation input. In embodiments, modifying the record may include adding information to the record. In embodiments, modifying the record may comprising adding first information to the record, independent of whether second information is removed from the record.

For multiple iterations of block 560, modifying records may include changing the validation information and label information of a first or second record and only changing the validation information of the other of the first and second records. Different modifications may be applied to a record and a next record in a sequence. In embodiments, modifying a record may include changing a validation information of each record in a sequence of records between a record associated with the confirmation input and a last record in the sequence of records for which a confirmation input was received. In such embodiments, modifying a record of transcript data may include changing a validation information of each of two or more sequential records in accordance with the single confirmation input. According to various aspects of the present disclosure, a record may also be modified at other blocks of method 500, including block 540.

At block 570, a display may be updated in accordance with the received one or more confirmation inputs. Updating a display may include modifying one or more display property for a selected record. Particularly, one or more display properties may be changed for a selected record to indicate when a validation status of a selected record has changed from non-validated to validated. For example, display property for a color, an emphasis of bold, a size, a font, an emphasis of italics, and an emphasis of highlighting may set to a different setting in accordance with the change in validation status. One or more such display properties may also be changed (e.g., set to a different setting for the display property) in accordance with other changes to a given record.

In embodiments, settings of display property for a selected record, next record, and other displayed records may be changed in ongoing manners, including in addition to being updated at block 570. For example, a display property for an aligned record may be modified in an ongoing manner in accordance with a change in a playback position of audio data. In embodiments, such updates may occur independent of confirmation inputs received at block 550. Other changes in a display property may also be applied at other blocks, such as block 540, reflecting a change in a state of validation of a corresponding record. Similarly, a change in display corresponding to updated label information may also occur for each secondary confirmation input received at block 550.

At block 580, a determination is made as to whether the computer-generated transcript data includes an additional record for which a confirmation input has not been received. If no such records exist, validated transcript data may be generated. If such records exist, a portion of method may be repeated at block 540 where a next record in the sequence is selected. In embodiments, the update of block 570 and the determination of block 580 may occur immediately and rapidly after a primary confirmation input is received at block 550 such that receiving the confirmation input includes automatically updating one or more display properties of a record and selecting a next record if one exists. The determination at block 580 may ensure that a confirmation input is received for each and every record in the computer-generated transcript data. Further, the confirmation inputs may be received in a same sequence as the records to which they are associated and subsequently applied. In embodiments, confirmation inputs may be limited to being provided in such a sequence, such that confirmation inputs may not be received, processed, or otherwise permitted for records in a sequence that does not parallel the sequence of records as originally provided in the computer-generated transcript data.

At block 590, validated transcript data is generated. Validated transcript data may include modified computer-generated transcript data in which each record in original computer-generated transcript data has been modified. Generating the validated transcript data may include storing the computer-generated transcript data as modified in accordance with the received confirmation inputs. Information of each record may be modified and stored on a computing device. Generating the validated transcript data may include transmitting indication of one or more of the received confirmation inputs, modified validation information, modified order information, modified label information, and new records from a local computing device to an evidence management system. The modified or new information may be transmitted to a second computing device after being received by the evidence management system. In embodiments, transmission of computer-generated transcript data to a second computing device, other than a first computing device, may be prevented unless a confirmation input is received for each record originally included in the computer-generated transcript data. Generating the validated transcript data may further include scanning validation information of each record in computer-generated transcript data and if any of the scanned records do not have validation information indicating validation status of validated, a request for the transcript data from the evidence management system may be denied. A request for non-validated transcript data may be blocked, unanswered, prevented, or otherwise unfulfilled except for a request from a computing device configured to perform validation steps such as shown in blocks of method 500. In embodiments, generating the validated transcript data may include transmitting only label information and order information of modified computer-generated transcript data as the validated transcript data. After block 590, method 500 ends.

In embodiments, one or more blocks of method 500 may be performed in a different order, including in parallel, relative to an example order as illustrated in FIG. 5. For example, a playback of audio data at block 530 may be performed concurrently with selection of a next record in computer-generated transcript data at block 540. Alternate orders, including those opposite or non-sequential relative to the blocks shown in FIG. 5 may be employed in embodiments according to various aspects of the present disclosure.

In embodiments, one or more blocks of method 500 may be performed automatically. For example, blocks 540, 560, 570, 580 may be performed by a computing device without or independent of user input, if any, received after execution of another block, such as block 550. Such automatic processing may expedite selection and validation of records. Such automatic processing may also enable one or more operations to performed concurrently, thus maximizing use of available resources for validating transcription data.

A computing device may perform a function. A computing device may provide a result of performing a function. A computing device may receive information, manipulate the received information, and provide the manipulated information. A computing device may execute a stored program to perform a function.

A computing device may provide and/or receive digital data via a conventional bus using any conventional protocol. A computing device may provide and/or receive digital data via a network connection. A computing device may store information and retrieve stored information. Information received, stored, and/or manipulated by the computing device may be used to perform a function and/or to perform a stored program.

A computing device may control the operation and/or function of other circuits and/or components of a system. A computing device may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a computing device and other circuits and/or components via any type of buss including any type of conventional data/address bus.

Figure 6:
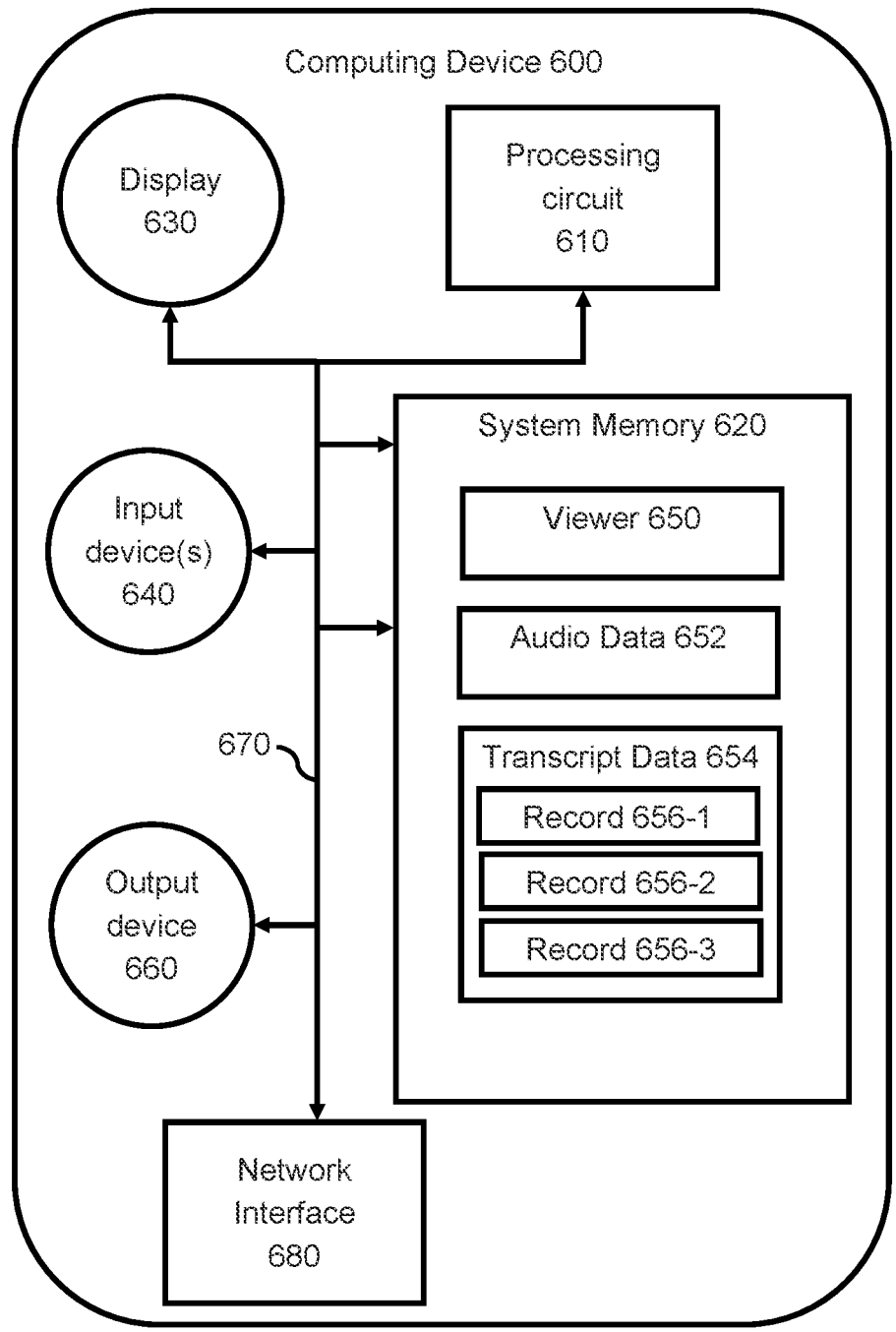
FIG. 6 is a block diagram of an example implementation of a computing device according to various aspects of the present disclosure.

FIG. 6 is a block diagram of an example implementation of a computing device according to various aspects of the present disclosure. In embodiments, the device may include a local computing device. For example, the device 600 may correspond to device 170. A second computing device configured to receive validated transcript data may include one or more of the components of device 600 in embodiments according to various aspects of the present disclosure. Recording device 600 includes processor 610, memory 620, a display 630, a user interface device comprising input devices 640, an output device 660, a communication bus 670, and a network interface 680. Processor 610 may include one or more processing circuits, one or more of which may be graphical processing units. Memory 620 may include a system memory configured to store instructions executable by processor 610 to perform operations. Display 630 may include a screen, monitor, or other graphical user interface device on which one or more records may be visually presented to a user. Input devices 640 may include a keyboard, keypad, mouse, microphone, touch input device, touch screen, tablet, and/or the like. Each input device may include one or more input elements. Each input element may include an actuator. For example, an input element of a keyboard may include an individual key of the keyboard. An input element of a mouse may include a button of the mouse. Storage medium 650 may include at least one computer-readable medium. Memory 620 stores transcript data 654, audio data 652, and a viewer 620 for the transcript data.

A viewer displays a record in accordance with information of the record. The viewer may include instructions that, when executed, cause a processor to perform operations for viewing records. The viewer may comprise an application executable on a local computing device. In some embodiments, a viewer may include a web-based interface, an app, a desktop application, or an application programming interface (API) for an operator to view records and enter associated confirmation inputs. In embodiments, the viewer may include a browser executable at a local computing device. The viewer may set a display property of the record in accordance with label information, order information, and/or validation information of the record. A setting for the display property may be selected in accordance with the information of the record and the viewer may interpret the setting to cause the record to be displayed with a visual characteristic that corresponds to the setting.

Viewer 650 enables display of transcript data 654. Transcript data 656 may include a computer-generated transcript data generated from audio data 652. The audio data 652 may be transmitted to a local computing device with the computer-generated transcript data. The computer-generated transcript data may comprise words detected by a transcription device from the audio data 652. The transcript data 654 includes a plurality of records 656 for the computer-generated transcript data, including first record 656-1, second record 656-2, and third record 656-3.

Output device 660 includes an audio transducer through which audio data 652 may be replayed as audio signals. Device 660 may include one more of a loudspeaker and a headset speaker. Output device 660 may provide audible information to a user corresponding to the audio data 652. Communication bus 670 enables communication between different components of device 600. Network interface 680 includes at least one communication circuit configured to transmit and receive data via a communication link. The communication link to which interface 680 is communicatively coupled made include one or more of wired communication link and a wireless communication link. In embodiments, processor 610 may receive audio data 654 and computer-generated transcript data 656 and upload modified computer-generated transcript data via the communication circuit 690. The modified computer-generated transcript data may be uploaded to a remote data store via the communication circuit 690.

A processing circuit includes any circuitry and/or electrical or electronic subsystem for performing a function. A processor circuit may include circuitry that performs (e.g., executes) a stored program. A processing circuit may execute one or more stored programs at the same time (e.g., in parallel). A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (e.g., op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may control the operation and/or function of other circuits and/or components of a system. A processing circuit may receive data from other circuits and/or components of a system. A processing circuit may receive status information from and/or regarding the operation of other components of a system. A processing circuit may perform one or more operations, perform one or more calculations, provide commands (e.g., instructions, signals) to one or more other components responsive to data and/or status information. A command provided to a component may instruct the component to start operation, continue operation, alter operation, suspend operation, and/or cease operation. Commands and/or status may be communicated between a processing circuit and other circuits and/or components via any type of bus including any type of conventional data/address bus.

A memory stores information. A memory provides previously stored information. A memory may provide previously stored information responsive to a request for information. A memory may store information in any conventional format. A memory may store electronic digital information. A memory may provide stored data as digital information.

A memory includes any semiconductor, magnetic, optical technology, or combination thereof for storing information. A memory may receive information from a processing circuit for storage. A processing circuit may provide a memory a request for previously stored information. Responsive to the request the memory may provide stored information to a processing circuit.

A memory may include any circuitry for storing program instructions and/or data. Storage may be organized in any conventional manner (e.g., program code, buffer, circular buffer). Memory may be incorporated in and/or accessible by a transmitter, a receiver, a transceiver, a sensor, a controller, and a processing circuit (e.g., processors, sequential logic).

A memory may perform the functions of a data store and/or a computer-readable medium. In embodiments, the memory may be a non-transitory medium.

A system memory may store data and/or program modules that are immediately accessible to and/or are currently being operated on by the processing circuit. A system memory may be a computer-readable medium. In this regard, a processor may perform or control the operation of a computing device by executing a stored program. In embodiments, memory 620 includes a system memory.

A communication bus transfers data between the components of a computing device. A communication bus may transfer data between computing devices. A communication bus may include a control bus, an address bus, and/or a data bus. A control bus may control access to the data and/or address bus. An address bus may specify a location of where data and/or control may be sent and/or received. Data, address, and/or control transfer via a communication bus may be unidirectional. Data, address, and/or control transfer via a communication bus may be bidirectional. Data, address, and/or control may be transferred serially and/or in parallel.

A communication bus may include any conventional control bus, address bus, and/or data bus (e.g., internal bus, expansion bus, local bus, front-side-bus, USB, FireWire, Serial ATA, AGP, PCI express, PCI, HyperTransport, InfiniBand, EISA, NuBus, MicroChannel, SBus, I2C, HIPPI, CAN bus, FutureBus). A communication bus may use any protocol, whether conventional or custom (e.g., application specific, proprietary) to transfer data.

A communication bus may transfer data, address, and/or control using any transmission medium. A transmission medium includes any material (e.g., physical) substance capable of propagating waves and/or energy (e.g., optical, electrical, electro-magnetic).

A network interface enables a computing device to communicate with other devices and/or systems over a network. The functions of a network interface may be performed by circuits, logic embedded in hardware, software instructions executable by a processor, or any combination thereof. The functions performed by a network interface enable a computing device to communicate with another device. The functions performed by a network interface, whether using hardware or software executed by a processor, may be referred to as services. A device may request the services of a communication interface to communicate with a computing device.

A network interface may comprise one or more communication circuits. A communication circuit may transmit and/or receive information (e.g., data). A communication circuit may transmit and/or receive (e.g., communicate) information via a wireless link and/or a wired link. A communication circuit may communicate using wireless (e.g., radio, light, sound, vibrations) and/or wired (e.g., electrical, optical) mediums. A communication circuit may communicate using any wireless (e.g., Bluetooth, BLE, Zigbee, WAP, WIFI, NFC, IrDA, LTE, GSM, GPRS, EDGE, EV-VO, 3G, 4G, 5G) and/or wired (e.g., USB, RS-232, Firewire, Ethernet) communication protocols. Short-range wireless communication (e.g., Bluetooth, Zigbee, NFC, IrDA) may have a limited transmission range of approximately 20 cm-100 m. Long-range wireless communication (e.g., GSM, GPRS, 3G, 4G, LTE, 5G) may have a transmission ranges up to 15 km. A communication circuit may receive information from a processing circuit for transmission. A communication circuit may provide received information to a processing circuit.

A communication circuit may include a transmitter and a receiver. A communication circuit may further include a decoder and/or an encoder for encoding and decoding information in accordance with a communication protocol. A communication circuit may further include a processing circuit for coordinating the operation of the transmitter and/or receiver or for performing the functions of encoding and/or decoding. A processing circuit of a system may perform the functions that a processing circuit of a communication circuit might perform.

A communication circuit in one system (e.g., server) may communicate with a communication circuit in another system (e.g., local computing device). Communications between two systems may permit the two systems to cooperate in performing a function of either system.

A user interface device provides an interface between a user and an electronic device. A user interface device enables communication between a user and an electronic device. A user interface device enables a human user to interact with an electronic device. A user may control, at least in part, an electronic device via the user interface device. A user may provide information and/or commands to an electronic device via a user interface device. A user may receive information and/or responses from the electronic device via the user interface device.

A user interface device may include one or more input elements or controls (e.g., switches, buttons, touch screen) that permit a user to interact and/or communicate with a device to control (e.g., influence) the operation (e.g., functions) of the device. Device 600 includes user interface devices comprising input devices 640.

A display device may provide information to a user. A user may receive visual, haptic (e.g., tactile, kinesthetic), and/or audible information from a display. A user may receive visual information via a graphical user interfaces (e.g., indictors) that convey visual information. A display device may include one or more of LCDs, LEDs, light sources, a graphical and/or textual display, a monitor, and a touchscreen.

A user of device 600 may control the operation of device 600, at least in part, via input device 640. For example, a user may start, stop, and/or pause playback of audio data. A user may also provide confirmation inputs. A user may further instruct device 600 to transfer transcript data to a server (e.g., 160). Device 600 may display computer-generated transcript data received from an evidence management system. The computer-generated transcript data comprises records. Device 600 may then receive confirmation inputs for each record in the computer-generated transcript data. Device 600 may modify the records in accordance with the received confirmation input or, alternately, transmit a copy of the confirmation inputs to an evidence management system, so that the evidence management system may modify the records. While FIG. 6 is discussed in the context of computing device 170, such components may also be included in other devices in the present disclosure, including a second computing device, server 160 or 180, and data store 150.

Embodiments according to various aspects of the present disclosure include an evidence management system. An evidence management system may provide computer-generated transcript data. After confirmation inputs have been received for the computer-generated transcript data, the evidence management system may receive modified records and provide validated transcript data based on the received modified records. System 700 is an example implementation of n evidence management system according to various aspects of the present disclosure. System 700 may comprise a server (e.g., server 160). System 700 may perform the functions of an evidence management system. In embodiments, an evidence management system receives recorded data, stores recorded data, analyzes recorded data to redact recorded data and/or generate redaction criteria, redacts recorded data, stores redaction criteria, identifies recorded data that is related to other recorded data, identifies redaction criteria that is related to recorded data, and/or stores redacted data. An evidence management system also receives and transmits both computer-generated transcript data and validated transcript data according to various aspects of the present disclosure.

Device 700 includes processing circuit 710, memory 720, transcript validation engine 730, transcription engine 740, computer-generated transcript data store 750, validated transcript data store 760, audio data store 770, and communication circuit 780.

A "data store" as described herein may be any suitable device configured to store data for access by a computing device. A data store receives data. A data store retains (e.g., stores) data. A data store retrieves data. A data store provides data for use by a system, such as an engine. A data store may organize data for storage. A data store may organize data as a database for storage and/or retrieval. The operations of organizing data for storage in or retrieval from a database of a data store may be performed by a data store. A data store may include a repository for persistently storing and managing collections of data. A data store may store files that are not organized in a database. Data in a data store may be stored in computer-readable medium.

A computer-readable medium may store, retrieve, and/or organize data. As used herein, the term "computer-readable medium" includes any storage medium that is readable by a machine (e.g., computer, processor, processing circuit). Storage medium includes any devices, materials, and/or structures used to place, keep, and retrieve data (e.g., information). A storage medium may be volatile or non-volatile. A storage medium may include any semiconductor (e.g., RAM, ROM, EPROM, Flash), magnetic (e.g., hard disk drive), optical technology (e.g., CD, DVD), or combination thereof. Computer-readable medium includes storage medium that is removable or non-removable from a system. Computer-readable medium may store any type of information, organized in any manner, and usable for any purpose such as computer readable instructions, data structures, program modules, or other data.

One example of a data store suitable for use with the high capacity needs of the evidence management system 700 is a highly reliable, high-speed relational database management system ("RDBMS") executing on one or more computing devices and accessible over a high-speed network. However, any other suitable storage technique and/or device capable of quickly and reliably providing the stored data in response to queries may be used, such as a key-value store and an object database.

Data store 770 stores recorded data. The recorded data may include audio data. System 700 may receive recorded data via communication circuit 780. The recorded data stored in data store 770 includes original data. The recorded data may be captured and stored on a recording device. The recorded data stored in data store 770 may be unredacted or unadjusted. The recorded data stored in data store 770 may include data from a plurality of recording devices, and metadata from a plurality of recording devices. Data store 770 may receive recorded data via communication circuit 790. Data store 770 may also transmit recorded data via communication circuit 790.

Data store 770 stores recorded data. System 700 may receive recorded data via communication circuit 780. The recorded data stored in data store 770 includes original data. The recorded data may be originally captured and stored on a recording device before being transmitted and stored in data store 770. Audio data from data store 770 may be transmitted via communication circuit 780 to a remote computing device for playback. The recorded data stored on data store 770 may also be transmitted to a transcription device vis circuit 780 for transcription. Alternately or additionally, the recorded data may be provided to transcription engine 740 for generating computer-generated transcript data. Data store 770 may receive recorded data via communication circuit 780. Data store 770 may also transmit recorded data via communication circuit 780. In embodiments, data store 770 may correspond to data store 150.

Data store 760 stores validated transcript data. In embodiments, system 700 may receive validated transcript data via communication circuit 780. For example, the validated transcript data stored in data store 770 may be generated at a remote computing device. Alternately, the validated transcript data may be generated by transcription validation engine 730 and received in the data store 760 from the engine 730. Data store 760 may also transmit validated transcript data via communication circuit 780. For example, validated transcript data may be transmitted from validated transcript data store 760 upon receipt of a request for the validated transcript data in data store 760.

Data store 750 stores computer-generated transcript data. In embodiments, system 700 may receive computer-generated transcript data via communication circuit 780. For example, the computer-generated transcript data stored in data store 750 may be generated at a remote transcription device. Alternately, the computer-generated transcript data may be generated by transcription engine 740 and received in the data store 750 from the engine 740. Data store 750 may also transmit computer-generated transcript data via communication circuit 780. For example, computer-generated transcript data may be transmitted from data store 750 a remote computing device upon receipt of a request for the computer-generated transcript data from the remote computing device. Data store 750 may receive computer-generated transcript data via communication circuit 780. Data store 750 may also transmit the computer-generated transcript data via communication circuit 780.

Transcription validation engine 730 manages transcript data and related audio data. Engine 730 may receive a request indicating that validated transcript data should be generated for audio data. The request may identify the audio data. In response to the request, engine 730 may control data store 770 to cause the audio data to be transmitted to one of transcription engine 740 and an external transcription server in communication with system 700 via circuit 780. Along with the audio data, engine 730 may also request that computer-generated transcript data be generated from the audio data. After the computer-generated transcript data is generated, the engine 730 may receive the requested computer-generated transcript data and cause the computer-generated transcript data to be stored in data store 750. The engine 730 may then control data store 750 to transmit the computer-generated transcript data to the computing device from which the request for computer-generated transcript data was initially received. In embodiments, engine 730 may alternately transmit the received computer-generated transcript data directly from a transcription device. A copy of the computer-generated transcript data may also be concurrently stored in data store 750 in such embodiments.

In embodiments, transcription validation engine 730 may also receive modified records from a computing device. The modified records may include records from computer-generated transcript data previously transmitted from system 700 to the computing device. The modified records may be stored as validated transcript data in validated transcript data store 760. In embodiments, engine 730 may also receive information from the modified records that may not be necessary for validated transcript data. For example, engine 730 may confirm that each record has been validated and, accordingly, remove validation information from each record prior to storage in data store 760. Such validation information may be extraneous upon confirmation of validation status of each modified record, whereby deletion of such information by engine 730 may save memory in data store 760 and details of the transcription validation process from being distributed in validated transcript data.

In embodiments, transcription validation engine 730 may also receive a request for validated transcript data. Upon receipt of such a request, engine 730 may confirm that validated transcript data exists in validated transcript data and/or each record stored in validated transcript data includes validation information indicating that the record is validated. If any record associated with computer-generated transcript data is not validated or validated transcript data is not otherwise stored in data store 760, the request may be denied or otherwise unfulfilled as discussed elsewhere herein. If the data exists and/or has been fully validated, engine 730 controls data store 760 and circuit 780 to transmit the requested validated transcript data via circuit 780 from data store 760. In embodiments, a request to generate computer-generated transcript data and receive validated transcript data may be received by system 700 from a second computing device, while a first computing device may perform intermediate operations including A transcription engine generates computer-generated transcript data. A transcription engine may receive audio data, analyze the audio data to identify words of one or more languages, and provide a record for each word identified for storage. A transcription engine may include sophisticated algorithms to perform semantic analysis. A transcription engine may use any suitable speech-to-text algorithms to produce the computer-generated transcript, including but not limited acoustic modeling, language modeling, Hidden Markov models, feedforward artificial neural networks, and recurrent neural networks.

Transcription engine 740 may be optionally included in system 700. Transcription engine 740 generates computer-generated transcript data from audio data. In embodiments, a transcription device may include engine 740 executed at system 700. System 700 may receive an indication of audio data for which validated transcript data is to be generated. Engine 730 may control data store 770 to provide the audio data associated with the request to engine 740. Engine 740 detects audio signals that correspond to words in the audio data and generates a computer-generated transcript data comprising a record for each detected word. Engine 740 may provide the computer-generated transcript data to engine 730 and/or data store 750.

Processing circuit 710 may control and/or coordinate the operation of transcript validation engine 730, transcription engine 740, computer-generated transcript data store 750, validated transcript data store 760, audio data store 770, and communication circuit 780. Processing circuit 710 may perform some or all of the functions of engines 730 and 740. Processing circuit 710 may transmit one or more of audio data, recorded data, computer-generated transcript data, records, transcript data, validated transcript data, and other information via communication circuit 780. Processing circuit 710 may receive information comprising recorded data, one or more instructions to transcribe audio data, and one or more instructions to provide validated transcription data via communication circuit 790 according to various aspects of the present disclosure.

Memory 720 may store programs executed by processing circuit 710. The stored programs stored in memory 720, when executed, may perform some or all of the functions of system 700 or any portion thereof. Memory 720 may perform some or all of the functions of redacted data store 780, and data store 770.

The term "engine" as used herein refers to, in general, circuitry, logic embodied in hardware and/or software instructions executable by a processing circuit. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Software instructions for execution by a processing circuit may be written in any programming language, including but not limited to C, C++, COBOL, JAVA™, Python, PHP, Perl, HTML, CSS, JavaScript, VBScript, ASPX, HDL, and/or Microsoft .NET™ programming languages such as C#. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as software for execution by a processing circuit may be stored in any type of computer-readable medium. An engine may be stored on and executed by one or more general purpose computers, thus creating a special purpose computer configured to perform the functions of (e.g., provide by) the engine.

A system may include one or more processing circuits configured to perform the functions of the illustrated engines, though the processing circuit that performs the functions of an engine may not be expressly shown.

Figure 7:
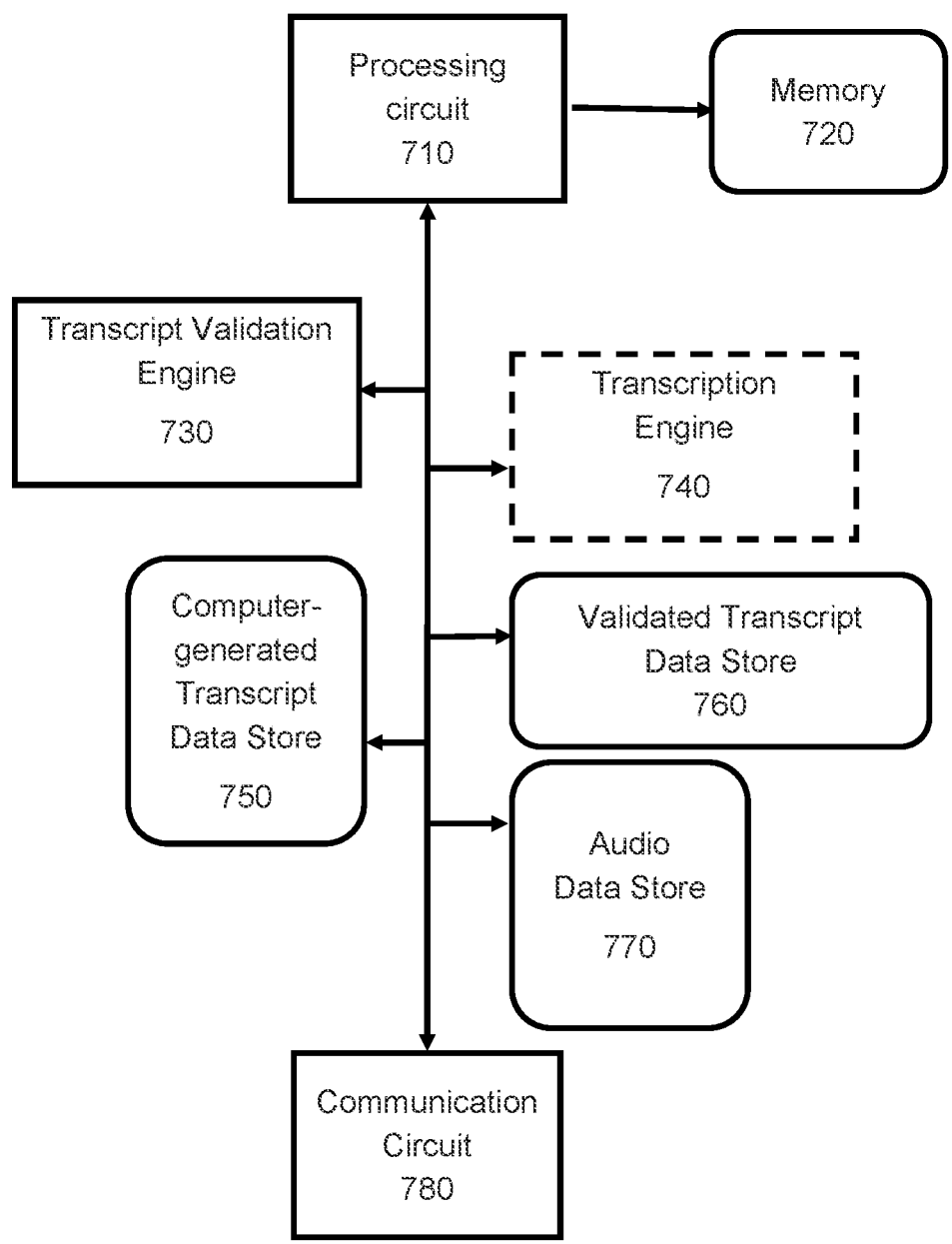
FIG. 7 is a block diagram of an example implementation of a redaction computing device according to various aspects of the present disclosure.

In embodiments, a data store may be integrated with another system. Separate data stores described herein may be combined into a single data store, and/or a single data store described herein may be separated into multiple data stores. For example, data store 770 is integrated with system 700 as shown in FIG. 7. A data store may also be directly accessible via a network, such as data store 150 accessible via network 140 in FIG. 1. An engine (e.g., transcript validation engine 730 or transcription engine 740) or processing circuit 710 may access a data store locally (e.g., via a data bus), over a network, and/or as a cloud-based service. For example, validated transcript data store 760 may be provided at a network location, such as data store 150, rather than integrated within system 700.

Figure 8:
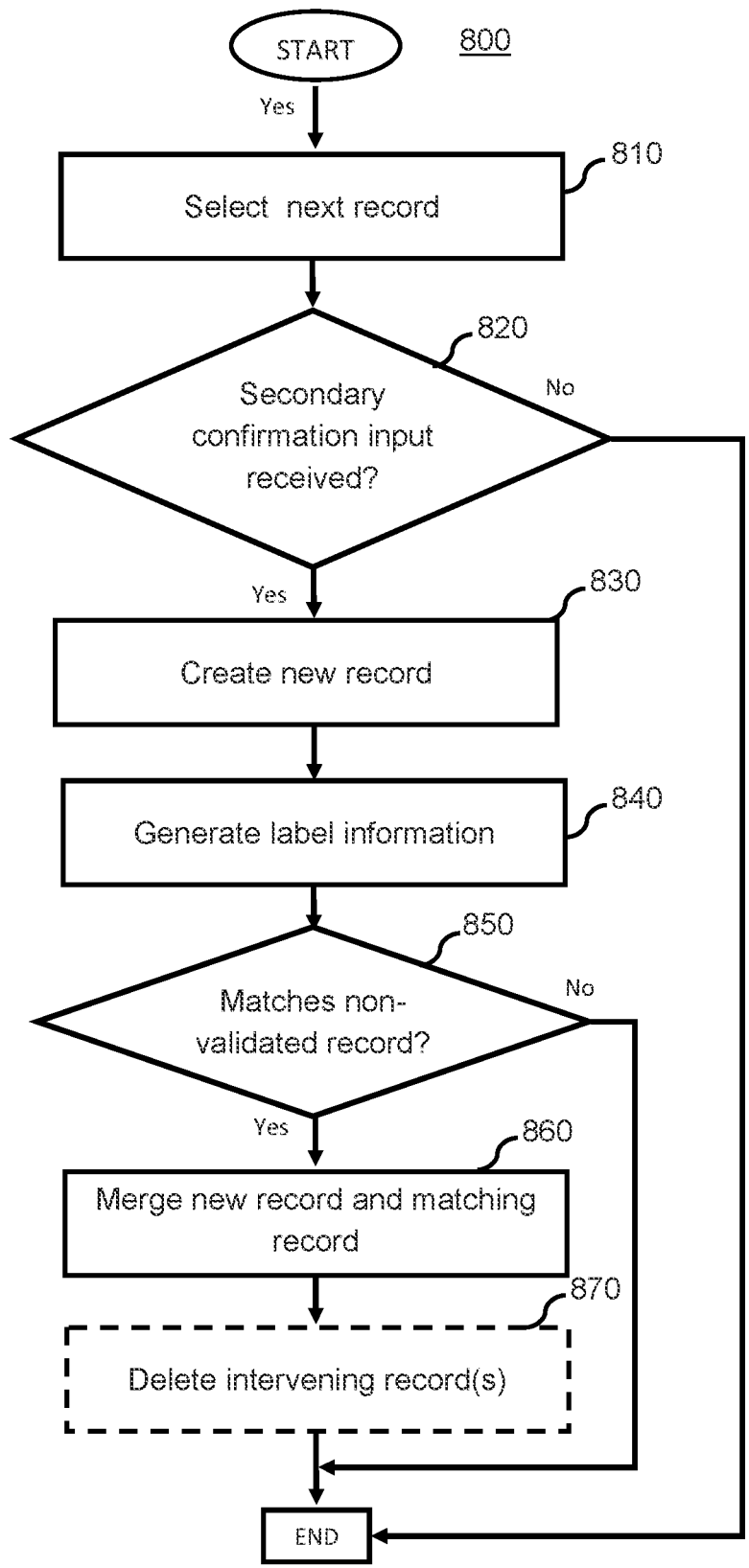
FIG. 8 is a flowchart illustrating an example method for validating transcript data according to various aspects of the present disclosure

FIG. 8 is a flowchart illustrating an example method for validating transcript data according to various aspects of the present disclosure. Method 800 enables confirmation inputs to add or confirm records. For example, confirmation inputs associated with method 800 may add new records, add label information to a record, or add validation information to a record. A discrete, separate confirmation input may not be required to delete or remove a record in computer-generated transcript data. Rather, records associated with inaccurate words or words that should be removed from a transcript may be deleted indirectly in accordance with received confirmation inputs that add or confirm records. A same confirmation input or sequence of confirmation inputs may both add or confirm a first record while also deleting one or more second records. Multiple second records may be deleted when a first new record is created in accordance with a sequence of confirmation inputs. The records in the computer-generated transcript data may be confirmed in a linear, additive manner, avoiding a need for an input that is specifically directed toward only a record that corresponds to an error in computer-generated transcript data. In embodiments, method 800 may correspond to operations of blocks 540-560 of method 500, with brief reference to FIG. 5.

Method 800 may be executed on one or more computing devices. For example, method 800 may be executed on an evidence management system or a combination of an evidence management system and a local computing device. In embodiments, a non-transitory computer readable medium may have stored thereon instructions for generating validated transcript data according to method 800. When these instructions are executed by one or more computing devices, they may cause the one or more computing devices to perform one or more operations of method 800. In embodiments according to various aspects of the present disclosure, a computing device may be configured to perform functions, including one or more operations of method 800. Execution of one or more operations of method 800 may include applying the one or more operations (e.g., steps or blocks 810-870) to computer-generated transcript data comprising two or more records.

To start, a next record is selected 810. The selection may be automatically performed by one or more computing devices on which method 800 is executed. In embodiments, selection of a record may include changing validation information of the record as discussed elsewhere herein. Selection of a record may also cause one or more display properties of the selected record to be changed. When a record is selected, subsequent confirmation inputs may be applied to one or more records relative to the selected record, including one or more confirmation inputs that are applied to the selected record itself. At block 810, the selected record may be associated with an unconfirmed word.

In embodiments, a primary confirmation input or secondary confirmation input may be received when a record is selected. For example, a selected record may be displayed on a display or other user interface of a local computing device and, while the selected record is displayed, a confirmation input may be received via a user interface device of the local computing device. Method 800 may proceed to block 820 when a confirmation input is received.

At block 820, a determination is made whether a received confirmation input is a secondary confirmation input. The determination may be performed relative to a first input received after a record is selected. In embodiments, a secondary confirmation input may be associated with a single character of text, such as a number, letter, or punctuation mark, or single space. The secondary confirmation input may comprise an alphanumeric input. The secondary confirmation input may only comprise inputs associated with letters or numbers. In embodiments, the secondary confirmation input may comprise an input associated with a punctuation mark. The secondary confirmation input may comprise only inputs associated with one or more punctuation marks. In embodiments, secondary confirmation inputs may comprise character-related inputs associated with one or more alphanumeric characters, one or more punctuation marks, or a combination of one or more alphanumeric characters and one or more punctuation marks. The secondary confirmation input may be received from a single input element among a predetermined set of input elements. The secondary confirmation input may be applied or applicable to change, update, or otherwise edit label information of a record. In embodiments, a single space, such as received via a space bar of a keyboard, may indicate that editing of an alphanumeric portion of label information is completed. When a secondary input is received, method 800 may proceed to block 830.

When a secondary confirmation input is not received at block 820, method 800 may end. For example, a primary confirmation input may be received while a record is selected. The primary confirmation input may indicate that a selected record is accurate and does not require further review or editing. For example, the primary confirmation input may be received via a key on a keyboard, a button on a foot pedal, or other input element on a user interface device dedicated, designated, selected, or otherwise configured to provide a signal indicative of a primary confirmation input. The primary confirmation input may comprise a typographical input. For example, the primary confirmation input may be associated with one or more of a tab, line return, and space, associated with a relative position between words that comprise sequences of alphanumeric characters. In embodiments, the primary confirmation input may comprise a non-alphanumeric input. The secondary confirmation input may exclude inputs associated with letters or numbers. In embodiments, a primary confirmation input may be received from an input element that is not used or configured to be used to edit label information of a record, such as a tab key on a keyboard. When a primary confirmation input is received, method 800 may end. In embodiments, other inputs, aside from a confirmation input may be received at block 820, causing method 800 to end.

At block 830, a new record may be created. A label information of the new record may include a single character associated with the received secondary confirmation input. The validation information of the new record may indicate that the record has a confirmed validation status. The new record may include order information indicating that the new record is positioned immediately prior to the selected record. In embodiments, the validation information of the new record may also be updated to indicate that the new record is a selected record, rather than the record previously selected at block 810. By selecting the new record, a subsequently received primary confirmation input may be applied to the new record. In embodiments, a new record may not need to be expressly selected, yet one or more additional confirmation inputs may be selectively applied to records in accordance with the secondary confirmation input received at block 820. In embodiments, a new record may be created in response to a secondary confirmation input, rather than the secondary confirmation input being applied to edit label information of a selected word.

At block 840, label information may be generated for the new record. The label information may include a first character associated with the received secondary confirmation input. Generating the label information may include further receiving one or more additional secondary confirmation inputs. At block 840, a sequence of secondary confirmation inputs may be received, uninterrupted by a primary confirmation input or other input. When each secondary confirmation input is received, a corresponding character may be added to label information for the new record. Each character of the label information may be displayed as a corresponding secondary confirmation input is received, including a character associated with a first received secondary confirmation input.

In embodiments, generating the label information may include receiving an indication that the label information for the new record is complete. The indication may be received in accordance with a particular input. Receiving the indication may include receiving the particular input. The particular input may be received via a predetermined input element. For example, receipt of an input from a space bar may indicate that complete label information has been generated. Receipt of an input associated with a character of a single space may indicate that label information has been completely generated. In embodiments, receipt of a primary confirmation input may alternately or additionally indicate that a complete set of label information has been generated. In embodiments, a primary confirmation input may comprise a single space, rather than a secondary confirmation input. The completed label information may correspond to a complete word.

Upon generation of label information for the new record 340, the label information may be compared to label information of other records in the computer-generated transcript data. The comparison may include determining whether the label information of the new record matches the label information of another record in the computer-generated transcript data. In embodiments, the match may be required to be an exact match for an entire set of label information in the other record. For example, label information of "little" for the new record may be determined to match another record with a same label information of "little". In embodiments, the match may include a match between the characters of the label information of the new record and a same number of initial characters for the other record. For example, the generated label information of "litt" may be determined to match a record in the computer-generated transcript data with the label information for the word "little". The generated label information may be determined to match the label information in accordance with a first portion of the label information, independent of a second portion of the label information.

At block 850, label information for the new record may be compared with label information of a number of subsequent records in computer-generated transcript data. The number may be predetermined. For example, the number may be one, two, three, four, five, ten, twenty, or another number of subsequent records. The number may be adjustable via one or more settings that are configurable at a local computing device.

In embodiments, the comparison may be performed after complete generation of label information. The comparison may be executed upon received of a particular input indicative of complete label information. By comparing complete label information for a record, an accurate comparison may be performed between records and an accurate match may be ensured.

In other embodiments, a comparison may be performed once at least a predetermined number of characters have been generated for label information of a new record. For example, a comparison may be formed once three or more, four or more, five or more, or six or more characters have been generated for label information of a new record. Each of the characters may be generated in association with a received secondary confirmation input. The threshold number of characters may or may not correspond to a complete length of label information by generated. In embodiments, the comparison may be performed before the label information is completely generated, enabling the match and the label information generation to be performed in parallel. The comparison may be performed before and/or independent of receiving an indication that the label information for the new record is complete. In embodiments, the comparison may be executed when one or more of complete label information is generated and/or at least a threshold number of characters for label information of the new record are generated.

In embodiments, a record with label information matching label information of a new record may be a first subsequent record for which label information is determined to match. Matching 850 label information of the new record with label information of another record may be executed by sequentially comparing each record in a sequence of records in accordance with the order information of the records. For example, a first record for which the comparison and determination of matching or non-matching label information may be made may comprise the selected or previously selected record. If the selected record does not have label information that matches the label information of the new record, label information of each record subsequent to the selected or previously selected record may be compared against the label information of the new record until matching label information is identified or a number of subsequent records have been compared with the label information of the new record. If a number of subsequent records have been compared and no match is determined at block 850, method 800 may end. If label information of another record matches the label information generated for the new record, method 800 may proceed to block 860.

At block 860, a new record and a matching record may be merged. In embodiments, merging the records may include copying information from one of the records to the other record. For example, order information of the matching record may be copied to the new record. In another example, the validation information of the new record may be copied into the validation information of the matching record. In other embodiments, a matching record may be simply marked as validated. Merging the records may include deleting one of the matching record and the new record. The deleted record may be deleted after information from the deleted record has been transferred to the other record. In embodiments, the deleted record may be deleted after the matching record has been validated.

In embodiments, merging a matching and new record may further include deleting one or more intervening records 870. The intervening records may include one or more records in a sequence between the new record and the record at which matching label information was identified. The intervening records may be determined relative to the order information of the records relative to the order information of the new and matching records. In embodiments, block 870 is indicated as optional, as the one or more intervening records may not exist. For example, if a new record matches a first, next record in a sequence of records, no intervening records will exist, nor will any such records need to be deleted. By deleting one more intervening records, validation of the computer-generated transcript data may be expedited. A functionality of secondary confirmation inputs may also be increased, as such inputs may be applied to generate a new record or validate an existing record, while also deleting one or more non-validated, inaccurate records. In terms of words, such an arrangement enables words to be inserted, deleted, or confirmed in a transcript without requiring non-alphanumeric or non-punctuation-related inputs to be received. For example, inputs associated with arrow keys or other navigational input elements may avoided, decreasing a complexity of a transcription task and a variety of inputs necessary to complete transcription of computer-generated transcript data.

After the one or more intervening records are deleted, method 800 may end. In embodiments, method 800 may be repeated for each record in a sequence of records of computer-generated transcript data. Method 800 may be repeated for each non-validated record in computer-generated transcript data until all records in the computer-generated transcript data have been validated.

In embodiments, matching may be performed after a sequence of multiple records may be added or confirmed via receipt of secondary confirmation inputs. For example, matching may be executed after two records are entered via sequences of secondary confirmation inputs. In these embodiments, confirmation or addition of a first record may not cause a comparison to be executed with the label information of the first record. The first record may be simply added or confirmed upon receipt of a first sequence of secondary confirmation inputs. However, if a second sequence of secondary confirmation inputs are received for a second record after the sequence of secondary confirmation inputs for the first record, a comparison between label information of records may be executed. In embodiments, the first record may be new and the second record may be confirmed via the secondary confirmation inputs and/or the first and second records may both be confirmed via the sequences of secondary confirmation input. In these embodiments, matching of label information for both first and second records may be performed relative to pairs of subsequent records. If a pair of subsequent records has label information that matches the label information of both the first and second records, then a match may be found. Records may be merged and intervening records may be deleted relative to the matching records and the first and second records, rather than a single matching record and a new record.

In embodiments, matching may include comparing an adjustable range of other records. For example, entry of a first new record may involve a comparison relative to a first number of subsequent records to identify a matching record. Upon entry of a second new record, subsequent to the first new record, the range may be increased to a second number of subsequent records to identify matching records for the first and second new records. For example, the first number may correspond to twenty records, while the second number may be twenty-five records. The number of compared other records may increase as an increasing sequence of records are created via secondary confirmation inputs, thereby increasing a possibility that a match will be determined. In embodiments, the number may be increased for a number of increasing records that are added, confirmed, or a combination of both added and confirmed via the secondary confirmation inputs.

In embodiments, matching label information of one or more records may include matching the label information to audio data from which computer-generated transcript data was initially generated. The label information and the audio data may be applied to an audio alignment engine which generates order information indicative of a location in the audio data at which the label information is detected. For example, the order information may indicate a range of microseconds in the audio data in which the label information is detected by the alignment engine. The order information may be used to identify a matching record for a new record in which the label information was generated. Such an arrangement involves text-to-audio matching, rather than just text-to-text matching. In embodiments, a text-to-audio match may enable a new record to be matched to an existing record in a sequence of records, independent of whether label information between the new record and existing record is identical. Rather, the new record and existing record may be matched in accordance with label information of the new record and audio data associated with the existing record. This manner of matching may be more accurate than text-to-text matching, particularly in the context of multiple inaccurate records in computer-generated transcript data.

In embodiments, a new record may be created after a first received secondary confirmation input is compared to label information of a selected record. For example, a new record may not be created until a sequence of secondary confirmation inputs corresponds to characters that differ from characters in label information of a selected record. As an example, a sequence of secondary confirmation inputs associated with characters "l-i-t" may not cause a new record to be created when label information of a selected and/or next record includes the characters "l-i-t-t-l-e". A new record may be created in this example if label information of a fourth sequentially received secondary confirmation input does not equal the character "t". If the label information of the fourth secondary confirmation input equals the character "t", a new record may not be created. In other embodiments, a new record may automatically be generated in accordance with each new sequence of one or more secondary confirmation inputs.

In embodiments, while a character associated with a received secondary confirmation input matches a character in label information, a display property of the label information may be changed for each matching character in the label information. For example, a cursor may be placed after each matching character in the label information of the selected record. As another example, a color or emphasis of each matching character may be changed in response to each secondary confirmation input. When a sequence of secondary confirmation inputs matches every character in label information of a selected record, validation information the selected record may be updated to indicate that the record is validated. However, if a secondary confirmation input is received that does not match a character of the label information of the selected word, a new record may be created. A mismatching secondary confirmation input received after a first character of label information of a secondary confirmation input may also cause one or more display properties of one or more characters of label information of the selected word to revert to a second display property associated with a non-validated status of the selected word. By creating new records after a mismatch between a selected record and a sequence of secondary confirmation input, creation and initial display of a new record may be avoided until the lack of the match is confirmed. Such an arrangement may require less visual space to display a matching records and/or storage space for creating a new record that might automatically be deleted on receipt of a next input.

An example embodiment of validating computer-generated transcript data is illustrated in FIG. 9. The computer-generated transcript data may be validated via one or more operations, including one or more operations such as shown in FIG. 8. As further illustrated in FIG. 9, embodiments according to various aspects of the present disclosure may include one or more secondary confirmation inputs used to indirectly edit a sequence of records. For example, rather than simply editing label information of a selected record, a secondary confirmation input may be applied to create a new record, confirm a record, or delete record in computer-generated transcript data. The one or more secondary confirmation inputs may both provide character information to be received in label information, but also modify the underlying sequence of the records themselves. An example embodiment of validating computer-generated transcript data involving such secondary confirmation inputs is illustrated in FIG. 9.

FIG. 9 is a diagram illustrating a user interface of a computing device for validating transcript data according to various aspects of the present disclosure, wherein FIG. 9*a*-9*h* each illustrate an example user interface in a different state of transcript validation. The states may be displayed on the user interface in sequence from FIG. 9*a* to FIG. 9*h*, wherein changes in state may occur in response to receipt of one or more confirmation inputs during each state.

As illustrated in FIG. 9, a computer-generated transcript data may be provided and edited in accordance with a sequence of confirmation inputs. The confirmation inputs may include both primary confirmation inputs and secondary confirmation inputs and the provided computer-generated transcript data may include records 910-990. Label information of each record 910-990 may correspond to a separate word. As shown in FIG. 9a, the words of initially provided records 910-990 correspond to the words in the sentence "The quick brown fox jumps over the lazy dog". However, in the example embodiments of FIG. 9, words in audio data from which the computer-generated transcript data was generated corresponded to the sentence, "The little brown fox likes the lazy dog". A sequence of received confirmation inputs may validate one or more of the records in the computer-generated transcript data that are accurate as initially provided, while also editing records that are inaccurate as initially provided.

To start, record 910 is selected as shown in FIG. 9a. The selection may be indicated in validation information of record 910. Display properties of record 910 may be altered or applied in accordance with this validation information. For example, a display property of cursor placement may be set to indicate that record 910 is a selected record. Particularly, selection of record 910 may be indicated by placement of cursor 911 adjacent to record 910. The cursor 911 may be placed at a beginning of displayed label information of record 910. In embodiments, placement of a cursor at various predetermined positions relative to the label information of a record, such as within a record or immediately adjacent a side (e.g., a left side) of the record may visually indicate that a record is selected.

Validation information for a selected record 910 may also indicate that record 910 is non-validated. Display properties of record 910 may be applied or adjusted to indicate this validation information as well. For example, a color of the label information of record 910, which corresponds to the letters "The" in FIG. 9a, is set to gray and an emphasis of italics is applied. In the example of FIG. 9, all records 910-990 initially have a non-validated type and display properties set according to this type.

When record 910 is selected, a primary confirmation input or a secondary confirmation input may be received. In the example of FIG. 9, a primary confirmation input may be received. Receipt of a primary confirmation input causes a validation status in validation information of record 910 to indicate that record 910 is validated. The received primary confirmation input also causes a next record 920 to be selected.

In FIG. 9b, record 920 is selected and cursor 911 is displayed at a position relative to record 920 indicative of this selection. Display properties of record 910 are updated in accordance with a change in validation information for record 910. For example, an emphasis and color of record 910 have been altered to be non-italicized and black as shown.

In the example embodiment of FIG. 9b, receipt of a secondary confirmation input causes a new record to be generated, rather than causing a direct change to label information of record 920, even though record 920 is selected. Particularly, receipt of secondary confirmation inputs causes a new record 915 to be created. Validation information of the new record 915 is generated to indicate that the record 915 has a validation status of confirmed. Because the record is created based on a secondary confirmation input, the validation information of the record is automatically set to indicate that the record is associated with a confirmed word. Label information of the new record 915 is created in accordance with the received secondary confirmation inputs. In the example of FIG. 9b, six secondary confirmation inputs are received, each associated with a letter in the word "little". Each secondary confirmation input is received in sequence and applied to record 915 to sequentially update the label information of the record 915. After the first secondary confirmation input in this sequence is received, the validation information of record 915 may be updated to reflect that record 915 is selected, rather than record 920, such that each sequentially received confirmation input will be applied relative to record 915 rather than record 920. After a number of secondary inputs are received for record 915, comparison to detect a match is performed for characters associated with the secondary confirmation inputs relative to a number of next records 920-990 in the computer-generated transcript data. The number of next records may be nine, such that all subsequent records are potentially compared if a match is not found, though in other embodiments, this number may be set to a higher or lower value, thereby increasing or decreasing a range of subsequent records that may be included in the comparison. However, because no match is identified for new record 915, no additional function is performed relative to the other records. After the secondary inputs are received to edit label information of record 915, a confirmation input is received to indicate that the label information is complete and that no additional characters are to be added. In embodiments, this confirmation input may be a confirmation input received via a space bar, corresponding to a single space character. In embodiments, a primary confirmation input may also be received at an end of a sequence of secondary confirmation inputs for a new record, the primary confirmation input also causing creation of a new record to be completed.

Upon completion of the new record, a next record may be selected. As shown in FIG. 9c, the next record may be record 920. Record 920 may be re-selected, though in other embodiments, selection of a record such as record 920 may be suspended and then reactivated while the new record 915 is created. At a state of FIG. 9c, a sequence of secondary confirmation inputs is received corresponding to characters of the word "brown". Again, a new record may be created and label information of this new record may be updated to reflect the received secondary confirmation inputs. As before, the characters in this label information may be compared to characters in label information of each subsequent record 920-990. For this set of secondary confirmation inputs, the label information of the new record does match another record. Specifically, the sequence of secondary confirmation inputs matches label information of record 930. In response to this determined match, the new record and record 930 are automatically merged. In embodiments, merging may include updating validation information of record 930 to indicate that record 930 is validated.

Responsive to the determined match, intervening records between the new record and the matching record may also be deleted. In the interface of FIG. 9c, the intervening record includes record 920. The receipt of secondary confirmation inputs matching record 930 indicate that this record 920 does not accurately reflect audio data from which the computer-generated transcript data of FIG. 9 was generated. The receipt of the secondary confirmation inputs indicates that record 920 should be removed. In embodiments, a single intervening record may be deleted in accordance with a determined match.

Accordingly, as shown in FIG. 9d, record 920 is deleted. Record 930 also includes validation information updated to indicate that it corresponds to a validated word and display properties of record 930 have been altered accordingly. This record 930 has been confirmed, despite a primary confirmation input not having been expressly received for record 930. Record 920 has also been deleted despite a lack of received confirmation input(s) being explicitly directed toward this incorrect record 920. Record 920 may be briefly selected after confirmation of new record 915, but no primary confirmation input may be received while record 920 is selected; rather, receipt of secondary confirmation inputs may cause a new second record and then merged with record 930. A confirmation input specifically associated with record 920 may not be received, yet record 920 may be deleted from the sequence of records in computer-generated transcript data. Such an arrangement enables confirmation inputs to be directed toward adding or confirming accurate records, avoiding a need for confirmation inputs that are expressly directed toward fixing an error in computer-based transcription. Each confirmation input may be additive, increasing a number of validated records, while avoiding other inputs that are expressly and solely employed to remove records or information from records in computer-generated transcript data. Receipt of secondary confirmation inputs matching record 930 has also enabled a next record, record 940 to be selected. In embodiments, record 940 may be automatically selected when label information for the second new record matches the label information of record 930 exactly (e.g., character-to-character). Alternately or additionally, record 940 may be automatically selected upon receipt of a primary confirmation input after the second new record is created and a minimum amount of label information of the created record matches label information of a subsequent record.

While interface of FIG. 9d is displayed, a primary confirmation input is received, indicating that record 940 is accurate. Accordingly, validation information of record 940 is updated and a next record 950 is selected as illustrated in FIG. 9e. As shown in FIG. 9c-9e, alternating combinations of primary and secondary confirmation inputs may be received in sequence to validate records in computer-generated transcript data. In embodiments, alternate sequences of primary confirmation input and secondary confirmation input may be received for records in received computer-generated transcript data, including those different from that which is illustrated in FIG. 9.

When record 950 is selected, a sequence of secondary confirmation inputs is received. The secondary confirmation inputs correspond to characters for the word, "likes". In response, a new record 945 is created and order information for this new record indicates that the new record should be located in the sequence between records 940 and 950. Validation information of record 945 also indicates that record 945 is validated and label information of record 945 is updated to include the characters, "likes", corresponding to the received secondary confirmation inputs. Because this label information does not match subsequent records 950-990, this new record 945 is not merged with another record in the sequence. A confirmation input indicating that all label information has been received for new record 945 and a next record, record 950, is selected.

When record 950 is selected as illustrated in the interface of FIG. 9f, another sequence of secondary confirmation inputs is received. The secondary confirmation inputs correspond to characters for the word, "the". Accordingly, a new record is created with this label information and a comparison between this label information and label information of subsequent records 950-990 is performed. The comparison indicates that this label information matches the label information of record 970. Accordingly, the new record and record 970 are merged. As part of the merging, order information of record 970 may be updated to indicate that record 970 is located immediately after new record 945 in the sequence of records. The validation information of record 970 may also be updated to indicate that record 970 is validated. Responsive to the determined match, intervening records 950-960 are also deleted and a next record 980 after record 970 is selected as shown in FIG. 9g. In embodiments, multiple intervening records may be deleted in accordance with a determined match.

When record 980 is selected, a sequence of two primary confirmation is received. The first primary confirmation input may cause validation information of record 980 to be updated to indicate that record 980 is validated. The first primary confirmation input may also cause record 990 to be selected (not shown). The secondary confirmation input may cause validation information of record 990 to be updated to indicate that record 990 is validated, thereby completing the validation of records of the computer-generated transcript data illustrated in FIG. 9h. While a sequence of primary confirmation inputs is received as discussed for interfaces 9g-9h, in other embodiments, receipt of two sequences of secondary confirmation input may also result in a same validation of records 980-990. Particularly, receipt of secondary confirmation inputs corresponding to the words "lazy" and "dog" interspersed with a single space corresponding to an input from a space bar on a keyboard, would have provided a same resulting set of validated transcription data according to various aspects of the present disclosure.

In embodiments, a next record corresponding to the punctuation mark "." may be automatically selected after a primary confirmation input or sequence of matching secondary confirmation inputs for record 990 is received. In other embodiment, a record may comprise label information that includes both alphanumeric characters and punctuation marks. For example, record 990 may comprise the punctuation mark "." Illustrated in FIG. 9h.

Figure 10:
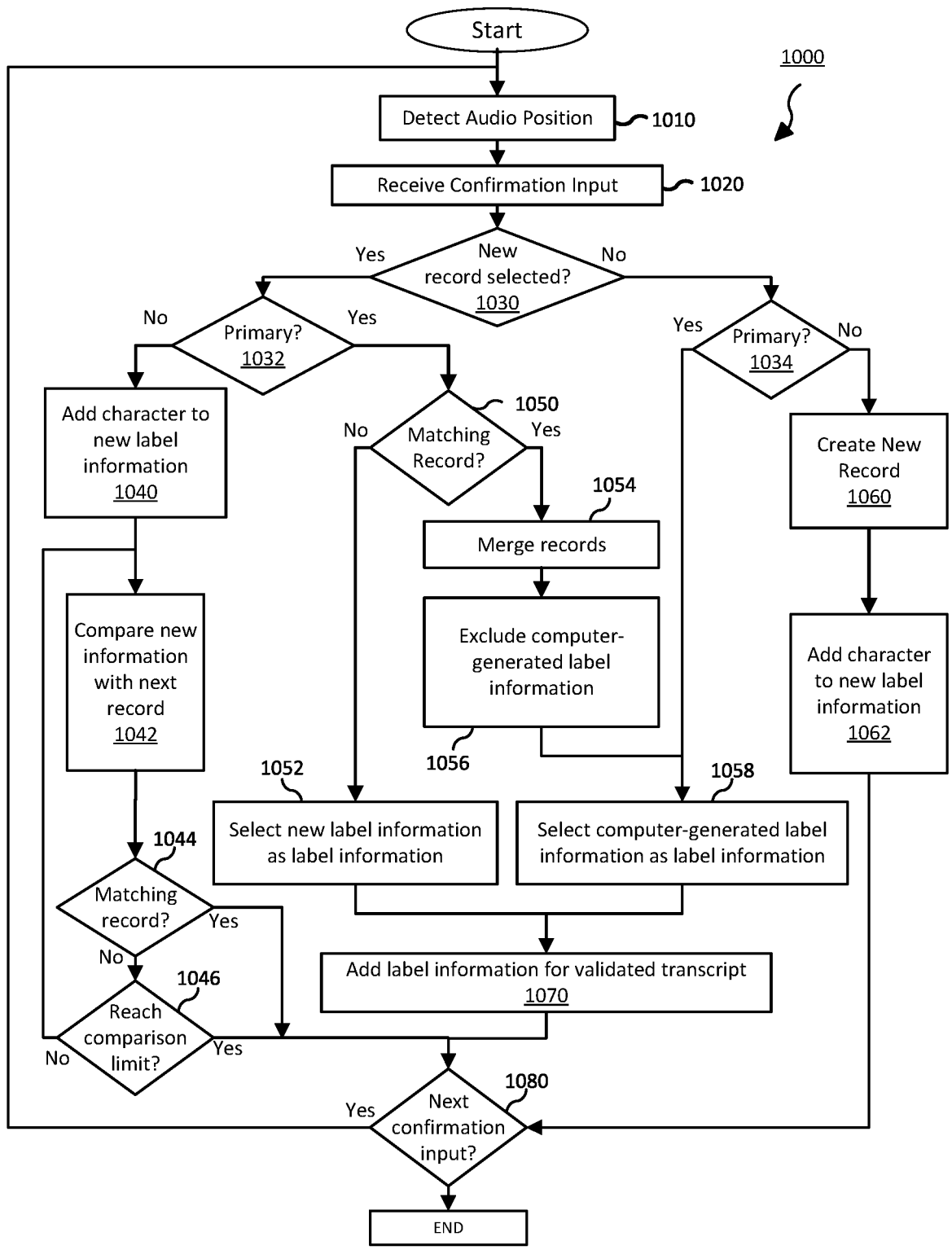
FIG. 10 is a flowchart illustrating an example method for generating a validated transcript in an additive manner according to various aspects of the present disclosure.

Embodiments according to various aspects of the present disclosure enable computer-generated transcript data to be validated in an additive manner. FIG. 10 is a flowchart illustrating an example method for providing validated label information for a validated transcript according to various aspects of the present disclosure. In order to minimize use of a computing device, example method 1000 enables additional information to be added for each confirmation input received at the computing device. The additional information may comprise adding new label information to the transcript. The additional information may comprise computer-generated label information and modified validation information. In embodiments, computer-generated label information may be validated and added to a set of validated label information for a validated transcript in accordance with modified validation information of a record associated with the computer-generated label information. In embodiments, validation information associated with a record may indicate whether the label information of the record is validated or non-validated.

In embodiments, generating a validated transcript may comprise generating validated transcript data. The validated transcript data may comprise validated label information associated with one or more words. The validated transcript data may comprise validated order information associated with the one or more words. The validated label information may be associated with respective validated order information of records in the validated transcript data. A record in the validated transcript data may comprise validated order information and validated label information. The record may further comprise validation information indicating the record in the validated transcript data is validated. In embodiments, a record in the validated transcript data may be a same record as a record in computer-generated transcript data, aside from a difference in validation information between the record of the validated transcript data and the record of the computer-generated transcript data. For example, the validation information may comprise an indication of a validated status for the record in the validated transcript data. In embodiments, the validated transcript may be extracted from the validated transcript data. For example, a validated transcript comprising a paper document or an electronic document may be generated in accordance with the validated transcript data, wherein the paper document or the electronic document comprises text that corresponds to the validated label information of the validated transcript data, further displayed in an order in accordance with validated order information of a plurality of records of the validated transcript data.

In example method 1000 of FIG. 10, at least one confirmation input may be received to generate validated transcript data. In embodiments according to various aspects of example method 1000, a sequence of confirmation inputs may be received. The sequence may comprise two or more confirmation inputs received in series. An intervening confirmation input may not be received between the two or more confirmation inputs of the sequence. The sequence may comprise consecutive confirmation inputs received by a computing device. The sequence may be received via at least one user interface device communicatively coupled with the computing device.

In embodiments, method 1000 may begin after computer-generated transcript data is provided for display. Information of a plurality of records of the computer-generated transcript data may be displaying in accordance with the computer-generated transcript data provided for display. For example, method 1000 may comprise one more operations performed for block 520 with brief reference to FIG. 5. Such an arrangement may enable the computer-generated transcript data to be reviewed. In accordance with providing the computer-generated transcript data for display, one or more confirmation inputs may be received.

In embodiments, method 1000 may begin after audio data is provided for playback. The audio data itself may be played back (e.g., output, transduced, etc.) in accordance with the audio being provide for the playback. For example, method 1000 may comprise one more operations performed for block 530 with brief reference to FIG. 5. Such an arrangement may enable the audio data from which the computer-generated transcript data was generated to be reviewed. In accordance with a correspondence between the computer-generated transcript data and the audio data, the one or more confirmation inputs may be received by a computing device. In embodiments, method 1000 may correspond to one or more operations of blocks 540-560 with brief reference to FIG. 5.

After starting method 1000, an audio position may be detected 1010. The audio position may comprise a time or chronological location in the audio data associated with a portion of the audio data most recently played back. The audio position or playback position may comprise one or more an absolute time and a relative time relative to reference time (e.g., seconds after start of audio data, etc.). The audio position may be chronologically later than order information of a selected record in embodiments according to various aspects of the present disclosure. In accordance with the audio position, the plurality of records of the computer-generated transcript data may comprise a first number of records earlier than the audio position and a second number of different records later (i.e., chronologically later in time) than the audio position. Order information of each record of the first number of records may be earlier (e.g., sooner, recorded prior to, etc.) than a time associated with the audio position. In embodiments, the audio position may be determined and then used to limit a number of the plurality of records of the computer-generated transcript data for which a respective confirmation input may be received. Such an arrangement may ensure that confirmation inputs are not provided for records associated with a portion of the audio data that has not been played back, thereby ensuring that confirmation inputs are provided, and corresponding validated transcript data is generated in accordance with one or more records associated with a second portion of audio data that has been played back. For example, the audio position may enable a rapid sequence of confirmation inputs, including primary confirmation inputs, to be received to rapidly validate sequential records of computer-generated transcript data. The rapid sequence may enable a user to validate the computer-generated transcript data as fast as they are able to process the computer-generated transcript data after hearing the audio data, while preventing validation of a portion of computer-generated transcript data for which audio data has not been played back. Such an arrangement decreases a required degree of accuracy for each confirmation input received by a computing device, while enabling a rate of receiving the confirmation inputs to be increased. The arrangement may also prevent inaccurate validation with respect to one or more records associated with a portion of audio data for which playback has not yet occurred.

After detecting 1010 the audio position, a confirmation input may be received 1020. As illustrated in FIG. 10, a next confirmation input may be received 1020 repeatedly. Repeated receiving 1020 may correspond to receiving a sequence of confirmation inputs. The sequence may include at least two confirmation inputs. The sequence may comprise a received confirmation input and a next received confirmation input. The sequence may comprise a first confirmation input and a second confirmation input. In the context of the sequence, the terms "first" and "second" may be used to refer to specific respective instance of a received confirmation input. However, absent additional description to the contrary, the terms "first", "second", and other numerical descriptions should not be construed to be limited to a particular order. For example, a second confirmation input may be received before or after a first confirmation input in embodiments according to various aspects of the present disclosure. In embodiments, receiving 1010 may comprise receiving a first confirmation input. In embodiments, receiving 1010 may comprise receiving a second confirmation input. In embodiments, receiving 1010 may comprise receiving a third confirmation input. In embodiments, receiving 1010 may be performed one or more times to receive one or more first, second, or third confirmation inputs, wherein each received confirmation input corresponds to an execution of block 1020. In embodiments, receiving 1020 may comprise receiving the confirmation input via a user interface device. The confirmation input may be received via a single input element of the user interface device. In embodiments, receiving 1020 may comprise receiving the confirmation input in accordance with a single actuation of an input element of the user interface device. In embodiments, multiple instances of receiving may comprise receiving confirmation inputs in accordance with a same input element or different input elements.

After receiving 1020, determining 1030 a type of a selected record may be performed. As discussed elsewhere herein, a record of computer-generated transcript data may be selected during processing of records of computer-generated transcript data. Selection of a record may identify a record to which a next confirmation input may be applied. In embodiments according to the present application, selecting a record may comprise selecting a record of computer-generated transcript data and selecting a new record. The new record may be separate (i.e., logically operated, stored, addressed, etc.) relative to records of computer-generated transcript data. The new record may comprise new label information generated in accordance with one or more previously-received confirmation inputs. While one or more confirmation inputs are received, new label information may be generated in accordance with the sequence. In embodiments, a new record, separate from the computer-generated transcript data, may be created and the new label information may be included in the new record. The one or more confirmation inputs may comprise at least one alphanumeric input from which the new label information may be generated. In accordance with other states of transcription validation, a previous confirmation input may have caused a next record of computer-generated transcript data to be selected, rather than a new record to be selected. In embodiments, the previous confirmation input may comprise a primary confirmation input. For example, a primary confirmation input associated with a non-alphanumeric input may have been previously received to one of confirm a match between new label information and modify validation information of a record of computer-generated transcript data. After the previous confirmation input, a next record of computer-generated transcript data may have been automatically selected in accordance with various aspects of the present disclosure. In accordance with determining a type of a selected record, further evaluation of the received confirmation input may be performed.

In embodiments, method 1000 may comprise determining 1032 a type of the received confirmation input. For example, determining 1032 may comprise determining whether the received confirmation input comprises a primary confirmation input. Determining may comprise processing the received confirmation input to determine an input element of a user interface device by which the received confirmation input was generated and subsequently received. In embodiments, a primary confirmation input may be received. The primary confirmation input may be applied to a record to modify information of the record. For example, the primary confirmation input may be applied to a record modify validation information of the record. In embodiments, a computing device may be configured to identify label information as validated label information and/or add the label information to a set of validated label information in accordance with a primary confirmation input. The set of validated label information may be stored in records. As discussed herein, a primary confirmation input may comprise a non-alphanumeric input received via a user interface device. In embodiments, a secondary confirmation input may be received. The secondary confirmation input may be applied to a record to modify information of a record. For example, the secondary confirmation input may modify label information of a selected record. As discussed herein, a secondary confirmation input may comprise an alphanumeric input received via a user interface device.

In accordance with receiving a non-primary confirmation input, a new character may be added 1040 to new label information. The new label information may comprise label information of a selected new record. The new character may comprise a single character. The new character may comprise an alphanumeric character. The new character may comprise a punctuation mark. In embodiments, the new character may be determined in accordance with the received confirmation input. For example, an input element comprising a key for the letter "a" may generate a confirmation input indicating and/or otherwise processed by a computing device to identify a letter "a" as a new character for a selected record. The new character may be appended to one or more previously-added characters in the new label information.

In accordance with the adding 1040, matching the new label information may be performed. The matching may comprise determining a matching record or determining the new label information does not match a record of a plurality of records of the computer-generated transcript data. The matching may comprise one or more of comparing 1042, determining a match 1044, and limiting 1046 a comparison in accordance with various aspects of the present disclosure. In embodiments, the matching may correspond to one or more operations of block 850 with brief reference to FIG. 8.

In accordance with the adding, comparing 1042 the label information to a next record in the computer-generated transcript data may be performed. The next record may comprise a subsequent record in the plurality of records of computer-generated transcript data. The next record may be determined relative to one or more of a previously-validated record of the computer-generated transcript data or validated transcript data, a selected record, and a record of the computer-generated transcript data for which a comparison was previously performed.

In embodiments, comparing 1042 may comprise comparing the new label information to a subset of next label information of the next record. In embodiments, comparing 1042, matching 1044, and limiting 1046 may correspond to one or more operations of block 850 with brief reference to FIG. 8. In embodiments, matching 1042 may be performed one or more times relative to one or more next records to compare the received label information comprising the new character to the one or more next records. Comparing 1042 may comprise comparing new or received label information associated with one or more other or third confirmation inputs received sequentially before or after the confirmation input associated with the received confirmation input.

In embodiments, determining 1044 a match or matching record may be performed in accordance with comparing 1042. In embodiments, the determining may comprise determining a match between new label information and next label information of a next record. Determining 1044 may comprise matching the new label information with a first subset of the second or next label information, independent of a second subset of the second or next label information. In embodiments, matching may comprise matching the received label information to a first next record of multiple next records of the plurality of records, wherein each record of the multiple next records comprises respective next label information that matches the received label information. For example, new label information associated with the characters "the" may match next label information of a plurality of subsequent records in computer-generated transcript data; however, a first next record in the sequence of next records may be determined as the matching record, independent of any other matching record in the computer-generated transcript data. Such an arrangement may minimize a number of intervening records between a selected record and the matching record, thereby minimizing a number of deleted and/or excluded records upon determining the matching record that matches the new record.

In embodiments, determining 1044 may comprise matching new label information associated with multiple new records with multiple next or second records of the plurality of records. For example, determining 1044 may comprise matching the new label information associated with a first new record after second new label information of a second new record is received. In such embodiments, comparing 1042 may comprise comparing new label information of multiple new records with multiple next records of the plurality of records of the computer-generated transcript data. The determining may comprise determining new label information of each of the multiple new records match next label information of each of multiple next records of the plurality of next records.

In embodiments, determining 1044 may comprise determining a matching record in accordance with a minimum number of characters of the new label information matching a next record. For example, once a minimum number of confirmation inputs are received and a corresponding number of characters are added to the new label information, a matching record may comprise a first next record comprising next label information that matches the minimum number of characters of the new label information.

In embodiments, determining 1044 may comprise determining the new label information matches the next record in accordance with comparing 1042. The determining may comprise determining and/or identifying the matching record for the new record. Order information of the new record may be updated to include an indication of the matching record. For example, the order information of the new record may be updated to include a sequence number or timestamp associated with the matching record. In embodiments, the matching record of the one or more next records may be updated to include an indication of the new record and/or an indication of the matching record may alternately be stored in a non-transitory medium associated with one or more computing devices on which method 1000 is executed. In embodiments, information of one of the new record and the matching record (e.g., validation information) may be modified to cause a change in display of the matching record. Determining matching 1044 may comprise modifying a display property of the matching record. For example, validation information of one of the new record and the matching record may be modified to cause the matching record to be underlined upon display of computer-generated transcript data associated with the matching record. The determining may comprise discontinuing matching the new label information. In accordance with determining 1044, determining 1080 whether to receive a next confirmation input may be performed.

In embodiments, determining 1044 may comprise determining the new label information does not match the next record. The new label information may be determined to not match next label information of a next record in accordance with comparing 1042.

In accordance with determining the next record does not match the new label information, limiting 1046 the comparing of the new label information may be performed. Limiting 1046 may comprise determining whether a limited number of next records have been compared with the new label information. The determining may comprise determining a number of the subsequent records having respective order information chronologically earlier than the playback position and adjusting the limited number in accordance with the second number. For example, audio data associated with ten subsequent records may have been played back, wherein the ten subsequent records are identified in accordance with the audio position and order information associated with each respective record of the ten subsequent records. In embodiments, the determining may comprise selecting a predetermined number and limiting the comparing of each next camera in accordance with the predetermined number. For example, a fixed number of eight subsequent records may be selected and, after an eighth next record is compared and a match is not detected, comparing another, ninth next record may be prevented. In embodiments, the determining may comprise adjusting the limited number in accordance with a number of confirmation inputs received for one or more new label information for which a match has not been identified. For example, the limited number may increase for each additional confirmation input received for the one or more new label information. In embodiments, limiting 1046 may comprise determining that the limited number has been compared and, as such, the limit has been reached. Determining the limit has been reached may comprise determining the new label information is different from computer-generated label information of the plurality of records. The new label information may be different from a plurality of subsequent records comprising at least two or more next records. In accordance with determining the limit has been reached, matching the new label information may be terminated for the received input. Indication of a match may not be generated in accordance with determining the limit has been reached. In accordance with determining the limit has been reached, determining 1080 whether to receive a next confirmation input may be performed. Alternately, limiting 1046 may comprise determining that the limited number has not been compared and, as such, the limit has not been reached. In accordance with determining the limit has not been reached, the matching may be repeated for a next record. In accordance with determining the limit has not been reached, comparing 1042 may be performed to compare the new label information with another next record.

In embodiments, determining 1032 may comprise determining the confirmation input corresponds to a primary confirmation input when a new record is selected. In accordance with the determining, determining a matching record 1050 for the new record may be performed.

In embodiments, determining 1050 may comprise determining whether indication of a matching record is stored in memory for the selected new record. For example, the selected new record may comprise order information indicating a match has been determined between the selected new record and a third next record of the plurality of records. In embodiments, determining 1050 may not comprise adding another new character to the new label information. Determining the matching record 1050 may comprise determining a matching record exists (i.e., has been identified, is matched, etc.). In accordance with determining the matching record exists, merging 1054 records may be performed.

In embodiments, merging records 1054 may comprise merging the selected new record and the matching record. Merging records may comprise transferring information from one of the records to the other records to generate a merged record. For example, merging records 1054 may comprise transferring (e.g., copying, appending, etc.) a portion of label information from the matching record to the new record. In embodiments, merging records 1054 may comprise changing a case of one or more first characters of new label information in the new records and, in accordance with determining the matching record, transferring a subsequent portion of the matching record to the new record. Such an arrangement may comprise determining matching 1044 independent of a case of a new character added to the new label information. However, such an arrangement may enable one or more confirmation inputs to be received to change a case of label information in a record of computer-generated transcript data, while not requiring a confirmation inputs to be provided or received for all label information of the record of computer-generated transcript data or for more characters than necessary to change a case of the characters for which the confirmation inputs are received. In embodiments, merging records 1054 may comprise transferring (e.g., copying, appending, etc.) one or more of order information and a portion of label information from one of the matching record and the new record to the other of the new record and the matching record. In embodiments, merging 1054 may comprise modifying validation information of the merged record to indicate a validated status for the merged record. In embodiments, merging 1054 may comprise deleting one of the matching record and the new record, thereby decreasing an amount of memory required to store a merged record. In embodiments, merging 1054 may correspond to one or more operations of block 860 with brief reference to FIG. 8.

In accordance with merging, excluding 1056 computer-generated transcript data may be performed. Excluding 1056 may generate excluded computer-generated transcript data. The excluded computer-generated transcript data may comprise computer-generated label information of a record of the computer-generated transcript data. The computer-generated label information may comprise at least one computer-generated character in the computer-generated label information. The record may be different from the records associated with merging 1054. Excluding 1056 may comprise deleting the computer-generated transcript data. Excluding 1056 may comprise modifying validation information of the record to indicate the exclusion of the computer-generated label information of the record. Excluding 1056 may comprise preventing a computing device from providing the computer-generated transcript data for a validated transcript. Excluding 1056 may comprise selecting a record subsequent the record in the records of the computer-generated transcript data. The selecting may include not modifying validation information associated with the excluding computer-generated label information.

In embodiments, excluding the computer-generated label information may comprise excluding label information of one or more intervening records. The intervening records may comprise one or more records in a sequence of records of the computer-generated transcript data between first record and a matching record. The first record may comprise a previously-validated record in the computer-generated transcript data. The first record may comprise a selected record in the computer-generated transcript data. In accordance with the excluding, the computer-generated label information may be rendered unavailable for a validated transcript. The computer-generated label information may be isolated from validated transcript data from which the validated transcript may be generated. Accordingly, one or more inaccurate words may be prevented from being propagated to a validated transcript, while retaining one or more accurate words represented in the computer-generated transcript data.

In accordance with excluding 1056, computer-generated label information may be selected 1058 as label information. Selecting 1058 may comprise selecting the computer-generated label information to generate selected label information. The label information may comprise validated label information. The label information may comprise computer-generated label information of the matching record. Selecting 1058 may comprise modifying validation information of one or more of the merged record and a matching record of the computer-generated transcript data to indicate a validated status for the record. In accordance with selecting 1058, adding 1070 label information may be performed.

In embodiments, adding label information 1070 may comprise modifying the selected label information. The modifying may comprise one or more of copying and moving the selected label information in memory. The modifying may comprise write-protecting the selected label information. The modifying may comprise updating one or more display properties of the label information. The modifying may comprise retaining the selected label information in the computer-generated transcript data and modifying validation information of a record comprising the selected label information. The modifying may comprise copying the selected label information to validated transcript data separate from the computer-generated transcript data. In accordance with the adding, display of the selected label information may be enabled after a record subsequent to a matching and/or selected record in the computer-generated transcript data being selected. Accordingly, in embodiments according to various aspects of the present disclosure, a same confirmation input may be applied to computer-generated transcript data to both add first label information to a validated transcript and exclude second label information from the validated transcript. Such an arrangement enables each confirmation input received for the computer-generated transcript data to be applied in an additive manner, wherein at least one character of validated label information is identified for a validated transcript for each received confirmation input, even for one or more of a plurality of confirmation inputs applied to exclude other label information from the validated transcript. Embodiments according to various aspects of the present disclosure enable a technology-based problem (e.g., inaccurate computer-generated transcript data) to be corrected using efficient, minimized additional inputs.

In embodiments, determining the matching record 1050 may comprise determining a matching record does not exist for a new record. The determining may comprise performing a comparison to determine the plurality of records of computer-generated transcript data does not comprise a next record that matches the new record. The determining may comprise an indication (or lack of indication) that a matching record does not exist. The determining may comprise determining the new label information is different from the plurality of records of the computer-generated transcript data. The plurality of records may comprise one or more next records for which comparing 1042 the new label information was performed. The new label information may be different from the computer-generated label information of one or more subsequent records in the computer-generated transcript data.

In accordance with determining a matching record does not exist, new label information may be selected as label information. Selecting 1052 may comprise selecting the new label information to generate selected label information. The label information may comprise validated label information. The label information may lack computer-generated label information in accordance with determining a matching record does not exist. Selecting 1058 may comprise modifying validation information of the new record. In embodiments, selecting 1058 may comprise adding the new record to the computer-generated transcript data. A computing device may be configured to insert the new record in a sequence of the computer-generated transcript data in accordance with the selecting 1058. In accordance with selecting 1058, adding 1070 label information may be performed. Adding 1070 after selecting 1052 may be similar to adding 1070 after selecting 1058. Such an arrangement demonstrates at least one benefit of embodiments according to the present disclosure, wherein a same confirmation input may be applied to provide different label information (e.g., computer-generated label information and label information received in accordance with one or more inputs from a user interface device) for a same validated transcript.

In embodiments, determining 1030 may comprise determining a selected record comprises a record of computer-generated transcript data, rather than a new a matching record does not exist for a new record. In accordance with determining the selected record comprises a record of computer-generated transcript data, determining 1034 a type of the received confirmation input may be performed. In embodiments, determining 1034 may comprise one or more same operations as determining 1032. Determining 1034 may comprise determining the received confirmation input comprises a primary confirmation input. Determining 1034 may comprise processing the received confirmation input to determine an input element of a user interface device by which the received confirmation input was generated and subsequently received. Alternately, determining 1034 may comprise determining the received confirmation input comprises a non-primary confirmation input. In embodiments, the non-primary confirmation input may comprise a secondary confirmation input.

In accordance with determining the received confirmation input comprises a primary confirmation input, selecting 1058 may be performed. Selecting 1058 computer-generated label information of the selected record may comprise one or more operations discussed above. In the context of determining 1030 and determining 1034 however, the computer-generated transcript data may comprise computer-generated label information selected directly from a record of the computer-generated transcript data. The computer-generated label information may comprise same label information as initially generated for the selected record in the computer-generated transcript data. Such an arrangement further enables a minimum, additive set of confirmation inputs to iteratively increase a degree to which a transcript is validated, while minimizing an extent of additional input necessary to address accurate data in the computer-generated transcript data. A same confirmation input determined at block 1032 may also be determined to be (or have been) received at block 1034, yet a different number of additional confirmation inputs may be required to add computer-generated transcript data to validated transcript data. For example, a first confirmation input may be applied to computer-generated transcript data via blocks 1030 and 1034 requiring zero additional inputs to generate first validated label information from a first record of the computer-generated transcript data, while a sequence of additional confirmation input may be required via at least blocks 1040-1044 to generate second validated label information in accordance with a second record of the computer-generated transcript data. Embodiments according to various aspects of the present disclosure enable a sequence of two confirmation inputs to add computer-generated label information to be added from two different records of computer-generated transcript data in two different manners. For example, one primary confirmation input may be processed in accordance with blocks 1032, 1050,1054, and 1056 to provide first computer-generated label information from a first record for a transcript and another primary confirmation input, received after the one primary confirmation input, may be processed in accordance with blocks 1034 and 1058 to provide second computer-generated label information from a second record for the same transcript, wherein the one primary confirmation input and the other primary confirmation input may be received sequentially in a sequence of confirmation input. Embodiments according to various aspects of method 1000 provide various other technical benefits, including those discussed elsewhere herein.

In various embodiments, creating 1060 new record may be performed in accordance with determining received confirmation input comprises a non-primary confirmation input at block 1034. Creating 1060 may comprise allocating an amount of memory for storing information associated with the new record. Creating 1060 may comprise generating order information. For example, a computing device may be configured to generate order information for the new record comprising one or more of a sequence and a time relative to the record selected prior to receiving the non-primary confirmation input. Creating 1060 may comprise selecting the new record as the record to which subsequent confirmation inputs may be applied.

In various embodiments, adding 1062 may be performed in accordance with creating 1060 the new record. Adding 1062 may correspond to one or more operations of adding 1040. In accordance with receiving a non-primary confirmation input, a new character may be added 1062 to new label information. The new label information may be label information of a new record created at block 1060. The new character may be a first character of the new label information. Adding 1062 may comprise generating new label information for the new record. The new character may comprise a single character. The new character may comprise an alphanumeric character. In embodiments, the new character may be determined in accordance with the received confirmation input. For example, an input element comprising a key for the letter "a" may generate a confirmation input indicating and/or otherwise processed by a computing device to identify a letter "a" as a new character for a selected record. The new character may be appended to one or more previously-added characters in the new label information.

In accordance with adding 1062 the new character, determining 1080 whether to receive a next confirmation input may be performed. Determining 1080 may comprise determining to not receive a next confirmation input. For example, the computer-generated transcript data may comprise no additional records to be validated in accordance with method 1000. In accordance with determining to not receive a next confirmation input, method 1000 may end.

In embodiments, an evidence management system for generating validated transcript data is provided. The system may comprise at least one memory storing instructions for validating computer-generated transcript data; and at least one processing circuit configured to execute the instructions, wherein execution of the instructions causes the evidence management system to: provide computer-generated transcript data associated with a plurality of words captured in audio data; receive a confirmation input associated with each word in the plurality of words; and generate validated transcript data in accordance with the received confirmation inputs and the computer-generated transcript data. The system may further comprise a data store configured to store one or more of the audio data, the computer-generated transcript data, the validated transcript data, and recorded data including the audio data. The system may further comprise a transcription device configured to process the audio data to generate the computer-generated transcript data. The system may further comprise a body-worn camera communicatively coupled to the system to provide the audio data, wherein the audio data is generated by the body-worn camera.

In embodiments, a computer-implemented method for generating a validated transcript is provided. The method may comprise providing computer-generated transcript data associated with a plurality of words captured in audio data; receiving a confirmation input associated with each word in the plurality of words; and generating validated transcript data in accordance with the received confirmation inputs and the computer-generated transcript data.

In embodiments, a non-transitory computer readable medium having stored thereon instructions for generating validated transcript data that when executed by one or more computing devices cause the one or more computing devices to perform operations is provided. The operations may comprise: providing computer-generated transcript data for a sequence of suggested words, the computer-generated transcript data including a first record for a first suggested word and a second record for a second suggested word; receiving a confirmation input for each record of the plurality of records, the received confirmation inputs including a first confirmation input for the first record and a second confirmation input for the second record; and generating validated transcript data in accordance with the received confirmation inputs and the computer-generated transcript data. The computer-generated transcript data may include a plurality of records, each record associated with a word detected in the audio data. The computer-generated transcript data may include a first record associated with a first word and a second record associated with a second word, the first word and second words associated with different portion of the audio data. Each record in the plurality of records may include label information for a word in the plurality or sequence of suggested words. In embodiments, each record in the plurality of records includes order information indicative of a position of the respective record relative to other records in the plurality of records. In embodiments, each record in the plurality of records includes validation information associated with a validation status of the respective record. In embodiments, the validation information of each record indicates whether the respective record is selected or not selected. In embodiments, the validation information of each record indicates whether the respective record is validated or non-validated. In embodiments, each record has one or more associated display properties. In embodiments, the one or more display properties include one or more of a font, size, emphasis of bold, emphasis of italics, emphasis of underlining, highlighting, or color for the label information for the record. In embodiments, providing the computer-generated transcript data includes displaying each record in accordance with the label information and the validation information of the respective record. In embodiments, displaying the computer-generated transcript data includes displaying all records in the computer-generated transcript data with a same display property indicative of an unconfirmed validation status. In embodiments, each record has a same validation information prior to the receiving of the confirmation inputs. In embodiments, providing the computer-generated transcript data includes setting a first display property of a record in accordance with validation information of the record. In embodiments, the first display property includes a color in which the record is displayed. In embodiments, providing the computer-generated transcript data includes setting a second display property of a record in accordance with validation information of the record, the second property different from the first property. In embodiments, the second display property includes a first emphasis with which the record is displayed. In embodiments, providing the computer-generated transcript data includes setting a third display property of a record in accordance with whether the record is selected and/or editable. In embodiments, the third display property includes a highlighting of the record. In embodiments, providing the computer-generated transcript data includes setting a fourth display property of a record in accordance with whether a playback position of audio data corresponds to order information of the record. In embodiments, the fourth display property includes a second emphasis of the record. In embodiments, each of the first, second, third, and fourth display properties are different display properties. In embodiments, providing the computer-generated transcript data includes automatically selecting a first record of the plurality of records. In embodiments, providing the computer-generated transcript data includes selecting a single record of the records at a time. In embodiments, providing the computer-generated transcript data includes displaying N records of the computer-generated transcript data at a time, the computer-generated transcript data including M records and M>N. In embodiments, N is equal or less than ten. In embodiments, providing the computer-generated transcript data includes displaying ten or fewer records in sequence ahead of a selected or audio aligned record. In embodiments, providing the computer-generated transcript data includes displaying between five and fifteen records ahead of a selected or audio aligned record. In embodiments, providing the computer-generated transcript data includes displaying a first set of records of the computer-generated transcript data and then displaying a second set of records of the computer-generated transcript data after the confirmation inputs have been received for each record in the first set of records. In embodiments, providing the computer-generated transcript data comprising transmitting the computer-generated transcript data to a local client device for display. In embodiments, providing the computer-generated transcript data comprises displaying the computer-generated transcript data. In embodiments, providing the computer-generated transcript data comprises playback of audio data concurrently with the display of words or records of the computer-generated transcript data. In embodiments, receiving the confirmation input for a record includes automatically updating one or more display properties of the record. In embodiments, receiving a conformation input associated with each word includes receiving a confirmation input for every record in the computer-generated transcript data. In embodiments, the confirmation inputs are received for each record in a sequence corresponding to a sequence of the records in the computer-generated transcript data. In embodiments, receiving a confirmation input includes automatically selecting a next record in the sequence of records. In embodiments, a record associated with a confirmation input includes a selected record. In embodiments, a record associated with a confirmation input includes a record at a position on a user interface device associated with location information of the received confirmation input. In embodiments, receiving the confirmation inputs includes receiving a first confirmation input associated with the first record and receiving a second confirmation input associated with a second word, wherein the first confirmation input and second confirmation input are received via a same input element on a user input device. In embodiments, the same input element includes one of a key on a keyboard, a button on a mouse, and a pedal on a foot pedal. In embodiments, the same input element includes a same actuator on a same user input device. In embodiments, receiving the confirmation inputs includes receiving a first confirmation input associated with the first record and receiving a second confirmation input associated with a second word. In embodiments, receiving the first confirmation input comprising receiving a primary confirmation input associated with a first input element. In embodiments, receiving the primary confirmation input comprises modifying validation information of the first record in accordance with the received primary confirmation input. In embodiments, receiving the first confirmation input comprising receiving one or more a secondary confirmation inputs associated with a first input element. In embodiments, the secondary inputs are received via one or more second input elements of a user interface device. In embodiments, the first input element is different from the one or more second input elements. In embodiments, receiving the one or more secondary confirmation inputs comprises modifying label information of the first record in accordance with the received one or more secondary confirmation inputs. In embodiments, the one or more secondary confirmation inputs are received prior to the primary confirmation input for a respective record. Any one of the above examples wherein receiving a confirmation input includes changing a validation information of each record in the sequence of records between a record associated with the confirmation input and a last record in the sequence of records for which a confirmation input was received. In embodiments, receiving a confirmation input includes receiving a single confirmation input associated with validation information of each of two or more records. In embodiments, receiving the confirmation input associated with each word in the plurality of words includes receiving a primary confirmation input for every record in the computer-generated transcript data. In embodiments, generating the validated transcript data includes storing the computer-generated transcript data as modified in accordance with the received confirmation inputs. In embodiments, generating the validated transcript data includes transmitting indication of one or more of the confirmation inputs and modified records from a local computing device to an evidence management system. In embodiments, the validated transcript data includes the computer-generated transcript data in which each record in the computer-generated transcript data has been modified. In embodiments, generating the validated transcript data includes modifying a record associated with the confirmation input. In embodiments, modifying the record includes changing the validation information associated with the record. In embodiments, modifying the record includes changing the label information associated with the record. In embodiments, generating the validated transcript data includes changing the validation information and label information of the first or second record and only changing the validation information of the other of the first and second records. In embodiments, generating the validated transcript data includes changing a validation information of each record in the sequence of records between a record associated with the confirmation input and a last record in the sequence of records for which a confirmation input was received. In embodiments, generating the validated transcript data includes changing a validation information of each of two or more sequential records in accordance with the single confirmation input. In embodiments, a computer-implemented method for generating a validated transcript is provided, the method comprising: providing computer-generated transcript data associated with a plurality of records, each record corresponding to a respective word detected in audio data; receiving at least one confirmation input associated with a first record; and generating validated transcript data by one of: adding the first record to the plurality of records; or confirming a second record in the plurality of words in accordance with the at least one received confirmation input. In embodiments, confirming the second record includes matching label information of the first record with label information of the second record. In embodiments, confirming the second record includes deleting one or more intervening records between a location associated with a receipt of the at least one confirmation input for the first record and a location of the second record. In embodiments, matching comprises matching label information of the first record with the audio data. In embodiments, receiving the at least one confirmation input includes receiving confirmation inputs associated with the first record and another first record in sequence and matching includes matching the first record and the other first record with the second record and another second record of the plurality of records. In embodiments, matching includes comparing the first record to a predetermined number of records of the plurality of record. In embodiments, the predetermined number is adjustable in accordance with a number of sequential records for which the at least one confirmation input is received.

In embodiments, a computing device for generating a validated transcript is provided, the computing device comprising: a data store configured to store audio data and computer-generated transcript data comprising a plurality of records, wherein each record of the plurality of records corresponds to a respective word detected in the audio data; at least one processing circuit; at least one tangible, non-transitory memory storing instructions that, when executed by the at least one processing circuit, cause the at least one processing circuit to perform operations comprising: providing the audio data for playback of the audio data; providing the computer-generated transcript data for display of the plurality of records; after the playback and the display, receiving at least one first confirmation input associated with a first record, wherein the at least one first confirmation input is received via a user interface device; in accordance with the receiving, automatically comparing the first record to the plurality of records to determine a matching record, wherein the matching record comprises a second record of the plurality of records; and in accordance with the comparing, validating the second record to generate the validated transcript, wherein the validating comprises modifying the second record. In embodiments, the validating comprises matching first label information of the first record with first label information of the second record. In embodiments, the matching comprises matching the first label information with a first subset of the second label information; and determining the matching record independent of a second subset of the second label information. In embodiments, the plurality of records comprises multiple matching records that match the first record and the comparing comprises selecting a next sequential record of multiple matching records as the matching record independent of a subsequent matching record of multiple matching records. In embodiments, the receiving comprises creating the first record and the validating comprises merging the first record and the second record in accordance with the comparing. In embodiments, the validating comprises deleting one or more intervening records of the plurality of records between a previously-validated record of the plurality of the records and the second record. In embodiments, the validating comprises both deleting the one or more intervening records and modifying the second record in accordance with a same confirmation input of the at least one first confirmation input. In embodiments, the same confirmation input is received via a same single input element of the user interface device. In embodiments, the validating further comprises automatically selecting a next record of the plurality of records after the second record in accordance with the same confirmation input of the at least one first confirmation input. In embodiments, the at least one first confirmation input is associated with multiple first records and the comparing includes matching the multiple first records with multiple second records of the plurality of records, and wherein the multiple first records comprise the first record and the multiple second records comprise the second record.

In embodiments, the operations further comprise: receiving at least one second confirmation input associated with a third record, wherein the at least one second confirmation input is received via the user interface device; in accordance with receiving the at least one second confirmation input, automatically performing a comparison between the third record and the plurality of records to determine the third record does not match the plurality of records; and in accordance with the comparison, adding the third record to the plurality of records.

In embodiments, the performing comprises comparing the third record to a limited number of subsequent records of the plurality of records. In embodiments, the at least one confirmation input comprises a plurality of confirmation inputs associated with a number of sequential first records, and wherein the sequential first records comprise the first record, and wherein the comparing comprises adjusting the limited number in accordance with the number of sequential records. In embodiments, providing the audio data comprises determining a playback position of the audio data, and wherein the comparing comprises determining the limited number in accordance with a second number of the subsequent records having respective order information chronologically earlier than the playback position. In embodiments, the operations further comprise: receiving a third confirmation input via the user interface device; and in accordance with receiving the third confirmation input, validating a selected record of the plurality of records, wherein the selected record comprises computer-generated label information and validating the selected record comprises retaining the computer-generated label information. In embodiments, the third confirmation input comprises a non-alphanumeric input and the at least one first confirmation input comprises an alphanumeric input. In embodiments, receiving the third confirmation input comprises receiving a sequence of third confirmation inputs, and wherein the sequence of third confirmation inputs includes the third confirmation input; and in accordance with receiving the sequence of third confirmation inputs, validating a sequence of selected records of the plurality of records, wherein each selected record of the sequence comprises respective computer-generated label information and validating the selected record comprises retaining the computer-generated label information. In embodiments, the validating the sequence of selected records comprises limiting the validating in accordance with an audio position, wherein a number of the sequence of selected records is limited in accordance with a number of the selected records for which audio playback has occurred, and wherein the number is determined in accordance with the audio position and order information of each record of the number of selected records.

While the preferred embodiment of the invention has been illustrated and described, it will be appreciated that various changes can be made therein without departing from the spirit and scope of the invention. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. Pluralities of elements discussed herein include at least a first" element and a second element. When a descriptive phrase includes a series of nouns and/or adjectives, each successive word is intended to modify the entire combination of words preceding it. For example, a black dog house is intended to mean a house for a black dog. In the claims, the term "provided" is used to definitively identify an object that not a claimed element of the invention but an object that performs the function of a workpiece that cooperates with the claimed invention.

The location indicators "herein", "hereunder", "above", "below", or other word that refer to a location, whether specific or general, shall be construed to refer to any location in the specification.

What is claimed is:

1. A computing device for generating a validated transcript, the computing device comprising:
   a data store configured to store audio data and computer-generated transcript data comprising a plurality of records, wherein each record of the plurality of records corresponds to a respective word detected in the audio data;
   at least one processing circuit;
   at least one tangible, non-transitory memory storing instructions that, when executed by the at least one processing circuit, cause the at least one processing circuit to perform operations comprising:
     providing the audio data for playback of the audio data;
     providing the computer-generated transcript data for display of the plurality of records;
     after the audio data is provided for playback and the computer-generated transcript data is provided for display, receiving at least one first confirmation input associated with a first record, wherein the at least one first confirmation input is received via a user interface device;
     in accordance with the receiving, automatically comparing the first record to the plurality of records to determine a matching record, wherein the matching record comprises a second record of the plurality of records; and
     in accordance with the comparing, validating the second record to generate the validated transcript, wherein the validating comprises modifying the second record.

2. The computing device of claim 1, wherein the comparing comprises matching first label information of the first record with second label information of the second record.

3. The computing device of claim 2, wherein the matching comprises:
   matching the first label information with a first subset of the second label information; and determining the matching record independent of a second subset of the second label information.

4. The computing device of claim 1, wherein the plurality of records comprises multiple matching records that match the first record and the comparing comprises selecting a next sequential record of the multiple matching records as the matching record independent of a subsequent matching record of the multiple matching records.

5. The computing device of claim 1, wherein the receiving comprises creating the first record and the validating comprises merging the first record and the second record in accordance with the comparing.

6. The computing device of claim 1, wherein the validating comprises deleting one or more intervening records of the plurality of records between a previously-validated record of the plurality of records and the second record.

7. The computing device of claim 6, wherein the validating comprises both deleting the one or more intervening records and modifying the second record in accordance with a same confirmation input of the at least one first confirmation input.

8. The computing device of claim 7, wherein the same confirmation input is received via a same single input element of the user interface device.

9. The computing device of claim 7, wherein the validating further comprises automatically selecting a next record of the plurality of records after the second record in accordance with the same confirmation input of the at least one first confirmation input.

10. The computing device of claim 1, wherein the at least one first confirmation input is associated with multiple first records and the comparing includes matching the multiple first records with multiple second records of the plurality of records, and wherein the multiple first records comprise the first record and the multiple second records comprise the second record.

11. The computing device of claim 1, wherein the operations further comprise:
receiving at least one second confirmation input associated with a third record, wherein the at least one second confirmation input is received via the user interface device;
in accordance with receiving the at least one second confirmation input, automatically performing a comparison between the third record and the plurality of records to determine the third record does not match the plurality of records; and
in accordance with the comparison, adding the third record to the plurality of records.

12. The computing device of claim 1, wherein the comparing comprises comparing the first record to a limited number of subsequent records of the plurality of records.

13. The computing device of claim 12, wherein the at least one first confirmation input comprises a plurality of confirmation inputs associated with a number of sequential first records, and wherein the sequential first records comprise the first record, and wherein the comparing comprises adjusting the limited number in accordance with the number of sequential first records.

14. The computing device of claim 12, wherein providing the audio data comprises determining a playback position of the audio data, and wherein the comparing comprises determining the limited number in accordance with a second number of the subsequent records having respective order information chronologically earlier than the playback position.

15. The computing device of claim 1, wherein the operations further comprise:
receiving a third confirmation input via the user interface device; and
in accordance with receiving the third confirmation input, validating a selected record of the plurality of records, wherein the selected record comprises computer-generated label information and validating the selected record comprises retaining the computer-generated label information.

16. The computing device of claim 15, wherein the third confirmation input comprises a non-alphanumeric input and the at least one first confirmation input comprises an alphanumeric input.

17. The computing device of claim 15, wherein receiving the third confirmation input comprises receiving a sequence of third confirmation inputs, and wherein the sequence of third confirmation inputs includes the third confirmation input; and
in accordance with receiving the sequence of third confirmation inputs, validating a sequence of selected records of the plurality of records, wherein each selected record of the sequence comprises respective computer-generated label information and validating the selected record comprises retaining the computer-generated label information.

18. The computing device of claim 17, wherein validating the sequence of selected records comprises limiting the validating in accordance with an audio position, wherein a number of the sequence of selected records is limited in accordance with a number of the selected records for which audio playback has occurred, and wherein the number of the sequence of selected records is determined in accordance with the audio position and order information of each record of the number of selected records.

19. A computer-implemented method, comprising:
providing audio data for playback by a transducer communicatively coupled with a computing device;
providing computer-generated transcript data comprising a plurality of records for display via a display device communicatively coupled with the computing device, wherein each record of the plurality of records corresponds to a respective word detected in the audio data;
after the audio data is provided and the computer-generated transcript data is provided, receiving, via a user interface device communicatively coupled to the computing device, at least one first confirmation input associated with a first record;
in accordance with the receiving, automatically comparing the first record to the plurality of records to determine a matching record, wherein the matching record comprises a second record of the plurality of records; and
in accordance with the comparing, validating the second record to generate the validated transcript, wherein:
the comparing comprises matching first label information of the first record with first label information of the second record; and
the validating comprises modifying the second record, wherein a display property of the second record for display of the second record via the display device is updated in accordance with the modifying.

20. The computer-implemented method of claim 19, wherein the validating comprises deleting one or more intervening records of the plurality of records between a previously-validated record of the plurality of records and the second record.

* * * * *